(12) United States Patent
Savarese et al.

(10) Patent No.: US 8,624,738 B2
(45) Date of Patent: Jan. 7, 2014

(54) GOLF CLUB APPARATUSES AND METHODS

(75) Inventors: Chris Savarese, Danville, CA (US);
Noel H. C. Marshall, Gerringong (AU);
Susan McGill, Redwood City, CA (US);
Kenneth P. Gilliland, Petaluma, CA (US); Marvin L. Vickers, Quincy, CA (US)

(73) Assignee: Radar Corporation, San Ramon, CA (US)

( * ) Notice: Subject to any disclaimer, the term of this patent is extended or adjusted under 35 U.S.C. 154(b) by 445 days.

(21) Appl. No.: 12/813,465

(22) Filed: Jun. 10, 2010

(65) Prior Publication Data

US 2010/0308105 A1 Dec. 9, 2010

Related U.S. Application Data

(63) Continuation-in-part of application No. 12/405,223, filed on Mar. 16, 2009, now Pat. No. 8,226,495.

(60) Provisional application No. 61/186,771, filed on Jun. 12, 2009, provisional application No. 61/037,305, filed on Mar. 17, 2008.

(51) Int. Cl.
*G08B 13/14* (2006.01)

(52) U.S. Cl.
USPC .................. 340/568.6; 340/686.1; 340/583; 340/571; 340/539.1

(58) Field of Classification Search
USPC ............. 340/568.6, 686.1, 583.5, 571, 539.1, 340/583
See application file for complete search history.

(56) References Cited

U.S. PATENT DOCUMENTS

| | | | |
|---|---|---|---|
| 3,226,704 A | 12/1965 | Petrash | |
| 4,489,314 A * | 12/1984 | Miller | 340/568.6 |
| 4,816,836 A | 3/1989 | Lalezari | |
| 4,858,934 A * | 8/1989 | Ladick et al. | 473/220 |
| 4,910,677 A | 3/1990 | Remedio et al. | |

(Continued)

FOREIGN PATENT DOCUMENTS

| | | |
|---|---|---|
| EP | 2 353 663 A1 | 8/2011 |
| FR | 2 875 109 | 3/2006 |

(Continued)

OTHER PUBLICATIONS

PCT International Preliminary Report on Patentability for PCT Appln No. PCT/US2010/038409, mailed on Dec. 12, 2011 8pages).

(Continued)

*Primary Examiner* — Daniel Wu
*Assistant Examiner* — Paul Obiniyi
(74) *Attorney, Agent, or Firm* — Blakely, Sokoloff, Taylor & Zafman LLP

(57) ABSTRACT

Apparatuses, methods and systems related to an improved golf data collecting and golf club notification system. The system reminds golfers when a club has been mistakenly left behind on the golf course and notifies the golfer when a golf club or clubs are in or out of the golf bag. The system can notify a golfer if a club or golf bag has been removed without authorization. In one preferred embodiment an apparatus that attaches to a golf club includes dual light sensors—one light sensor configured as a switch and one light sensor configured as a light meter. Algorithms make use of the light sensor data to determine whether a golf club is in or out of a golf bag.

23 Claims, 15 Drawing Sheets

Tag Transmitter Schematic

(56) References Cited

U.S. PATENT DOCUMENTS

| | | | |
|---|---|---|---|
| 5,041,815 A * | 8/1991 | Newton | 340/568.6 |
| 5,086,390 A | 2/1992 | Matthews | |
| 5,127,044 A | 6/1992 | Bonito et al. | |
| 5,283,733 A | 2/1994 | Colley | |
| 5,298,904 A | 3/1994 | Olich | |
| 5,305,998 A | 4/1994 | Nesbit et al. | |
| 5,324,028 A * | 6/1994 | Luna | 473/169 |
| 5,389,777 A * | 2/1995 | Chin | 250/214 PR |
| 5,493,274 A * | 2/1996 | Long | 340/568.6 |
| 5,507,485 A | 4/1996 | Fisher | |
| 5,565,845 A * | 10/1996 | Hara | 340/568.6 |
| 5,574,430 A * | 11/1996 | Ott et al. | 340/568.2 |
| 5,610,585 A * | 3/1997 | Jobe | 340/568.6 |
| 5,760,711 A * | 6/1998 | Burns | 340/962 |
| 5,783,996 A * | 7/1998 | Muszynski | 340/571 |
| 5,844,483 A * | 12/1998 | Boley | 340/568.6 |
| 5,870,023 A * | 2/1999 | Jackson | 340/568.6 |
| 5,877,686 A * | 3/1999 | Ibey et al. | 340/571 |
| 5,909,090 A * | 6/1999 | Nakamura et al. | 315/307 |
| 5,949,198 A * | 9/1999 | Nakamura et al. | 315/307 |
| 5,952,921 A * | 9/1999 | Donnelly | 340/568.6 |
| 5,963,134 A | 10/1999 | Bowers et al. | |
| 5,973,596 A * | 10/1999 | French et al. | 340/568.6 |
| 6,021,247 A * | 2/2000 | Helble | 385/147 |
| 6,023,225 A * | 2/2000 | Boley et al. | 340/568.6 |
| 6,030,109 A * | 2/2000 | Lobsenz | 700/92 |
| 6,052,056 A * | 4/2000 | Burns et al. | 340/583 |
| 6,057,762 A * | 5/2000 | Dusza | 340/568.6 |
| 6,076,668 A * | 6/2000 | Keane et al. | 206/315.4 |
| 6,118,376 A * | 9/2000 | Regester | 340/568.6 |
| 6,148,271 A | 11/2000 | Marinelli | |
| 6,181,246 B1 * | 1/2001 | Ewing et al. | 340/571 |
| 6,304,211 B1 * | 10/2001 | Boman | 342/357.34 |
| 6,305,944 B1 * | 10/2001 | Henry et al. | 439/22 |
| 6,353,386 B1 * | 3/2002 | Castonguay et al. | 340/540 |
| 6,363,785 B1 * | 4/2002 | Senghaas et al. | 73/313 |
| 6,366,205 B1 * | 4/2002 | Sutphen | 340/568.6 |
| 6,377,175 B1 * | 4/2002 | Williams | 340/568.6 |
| 6,407,668 B1 * | 6/2002 | Beham | 340/568.6 |
| 6,411,211 B1 * | 6/2002 | Boley et al. | 340/568.6 |
| 6,466,162 B2 * | 10/2002 | Boman | 342/357.34 |
| 6,577,775 B1 * | 6/2003 | Li | 382/274 |
| 6,582,328 B2 | 6/2003 | Kuta et al. | |
| 6,677,861 B1 * | 1/2004 | Henry et al. | 340/855.3 |
| 6,696,950 B2 * | 2/2004 | Adolphson | 340/568.6 |
| 6,705,942 B1 | 3/2004 | Crook et al. | |
| 6,714,670 B1 * | 3/2004 | Goldsworthy et al. | 382/149 |
| 6,753,778 B2 * | 6/2004 | Kruger | 340/568.6 |
| 6,769,799 B2 * | 8/2004 | Goto et al. | 362/551 |
| 6,774,792 B1 * | 8/2004 | Williams | 340/568.6 |
| 6,816,645 B2 * | 11/2004 | Tai | 385/34 |
| 6,908,404 B1 | 6/2005 | Gard | |
| 6,928,864 B1 * | 8/2005 | Henry et al. | 73/152.54 |
| 6,967,563 B2 * | 11/2005 | Bormaster | 340/10.31 |
| 7,004,848 B2 * | 2/2006 | Konow | 473/223 |
| 7,106,195 B2 * | 9/2006 | Keays | 340/568.6 |
| 7,118,498 B2 | 10/2006 | Meadows et al. | |
| 7,121,962 B2 | 10/2006 | Reeves | |
| 7,143,639 B2 | 12/2006 | Gobush | |
| 7,183,552 B2 * | 2/2007 | Russell | 250/338.5 |
| 7,205,894 B1 * | 4/2007 | Savage | 340/568.6 |
| 7,303,070 B1 * | 12/2007 | Hong et al. | 206/315.6 |
| 7,436,316 B2 * | 10/2008 | Fleischman et al. | 340/686.1 |
| 7,486,386 B1 * | 2/2009 | Holcombe et al. | 356/4.01 |
| 7,638,743 B2 * | 12/2009 | Bartol et al. | 250/205 |
| 7,654,023 B2 * | 2/2010 | Peters et al. | 40/547 |
| 7,746,227 B2 * | 6/2010 | Keays | 340/568.6 |
| 7,894,177 B2 * | 2/2011 | Rothkopf | 361/173 |
| 7,942,762 B2 * | 5/2011 | Balardeta et al. | 473/407 |
| 8,009,046 B2 * | 8/2011 | Keays | 340/568.6 |
| 8,070,629 B2 * | 12/2011 | Balardeta et al. | 473/407 |
| 2001/0045904 A1 | 11/2001 | Silzer Jr. | |
| 2002/0004723 A1 | 1/2002 | Meifu et al. | |
| 2002/0044086 A1 * | 4/2002 | Boman | 342/357.08 |
| 2002/0089420 A1 * | 7/2002 | Martineau et al. | 340/463 |
| 2002/0177490 A1 | 11/2002 | Yong et al. | |
| 2002/0186132 A1 * | 12/2002 | Kruger | 340/568.6 |
| 2002/0188359 A1 | 12/2002 | Morse | |
| 2003/0071729 A1 * | 4/2003 | Adolphson | 340/568.6 |
| 2003/0132844 A1 * | 7/2003 | Walker | 340/568.6 |
| 2003/0136486 A1 * | 7/2003 | Bradshaw | 150/160 |
| 2003/0174516 A1 * | 9/2003 | Goto et al. | 362/551 |
| 2003/0191547 A1 * | 10/2003 | Morse | 700/91 |
| 2003/0228101 A1 * | 12/2003 | Tai | 385/34 |
| 2004/0147329 A1 | 7/2004 | Meadows et al. | |
| 2004/0261924 A1 * | 12/2004 | Bradshaw | 150/160 |
| 2005/0070375 A1 | 3/2005 | Savarese et al. | |
| 2005/0268704 A1 | 12/2005 | Bissonnette et al. | |
| 2005/0272516 A1 | 12/2005 | Gobush | |
| 2005/0282650 A1 | 12/2005 | Miettinen et al. | |
| 2006/0105857 A1 | 5/2006 | Stark | |
| 2006/0109116 A1 * | 5/2006 | Keays | 340/568.6 |
| 2006/0148594 A1 | 7/2006 | Saintoyant et al. | |
| 2006/0178110 A1 | 8/2006 | Nurminen et al. | |
| 2006/0192679 A1 | 8/2006 | Buckley et al. | |
| 2006/0225327 A1 * | 10/2006 | Peters et al. | 40/547 |
| 2006/0238347 A1 * | 10/2006 | Parkinson et al. | 340/572.4 |
| 2006/0270450 A1 | 11/2006 | Garratt et al. | |
| 2007/0000584 A1 * | 1/2007 | Reynolds et al. | 150/160 |
| 2007/0002159 A1 * | 1/2007 | Olsen et al. | 348/335 |
| 2007/0008120 A1 | 1/2007 | Smith et al. | |
| 2007/0040683 A1 | 2/2007 | Oliver et al. | |
| 2007/0097065 A1 | 5/2007 | Kreek et al. | |
| 2007/0129178 A1 | 6/2007 | Reeves | |
| 2007/0135237 A1 | 6/2007 | Reeves | |
| 2007/0152840 A1 * | 7/2007 | Fleischman et al. | 340/686.1 |
| 2007/0156364 A1 * | 7/2007 | Rothkopf | 702/117 |
| 2007/0171059 A1 | 7/2007 | Pistilli | |
| 2007/0182571 A1 | 8/2007 | Kennish et al. | |
| 2007/0191126 A1 | 8/2007 | Mandracken | |
| 2008/0024298 A1 * | 1/2008 | Keays | 340/568.6 |
| 2008/0158002 A1 * | 7/2008 | Parkinson et al. | 340/825.49 |
| 2008/0207357 A1 * | 8/2008 | Savarese et al. | 473/407 |
| 2008/0218342 A1 * | 9/2008 | Keays | 340/568.6 |
| 2008/0218343 A1 * | 9/2008 | Lee et al. | 340/568.6 |
| 2009/0003136 A1 | 1/2009 | Karr | |
| 2009/0017944 A1 * | 1/2009 | Savarese et al. | 473/407 |
| 2009/0082139 A1 * | 3/2009 | Hart | 473/407 |
| 2009/0111602 A1 | 4/2009 | Savarese et al. | |
| 2009/0209358 A1 * | 8/2009 | Niegowski | 473/223 |
| 2009/0233735 A1 | 9/2009 | Savarese et al. | |
| 2009/0326688 A1 * | 12/2009 | Thomas et al. | 700/91 |
| 2011/0076657 A1 * | 3/2011 | Forest | 434/252 |
| 2011/0077093 A1 * | 3/2011 | Garratt et al. | 473/131 |
| 2011/0116201 A1 * | 5/2011 | Rothkopf | 361/170 |
| 2011/0304460 A1 * | 12/2011 | Keecheril et al. | 340/572.1 |
| 2012/0088544 A1 * | 4/2012 | Bentley et al. | 455/556.1 |

FOREIGN PATENT DOCUMENTS

| | | |
|---|---|---|
| GB | 2 440 027 | 1/2008 |
| JP | 7-272130 A | 10/1995 |
| JP | 9-56862 A | 3/1997 |
| JP | 2006-223551 A | 8/2006 |
| JP | 2008-079965 A | 4/2008 |
| WO | WO 2005/028035 A1 | 3/2005 |
| WO | WO 2007/110464 A1 | 10/2007 |
| WO | WO 2008/038668 A | 4/2008 |
| WO | WO 2009/004391 A2 | 1/2009 |
| WO | WO 2009/004391 A3 | 1/2009 |
| WO | WO 2010/144863 A2 | 12/2010 |

OTHER PUBLICATIONS

PCT International Search Report and Written Opinion for PCT Appln No. PCT/US2009/001698, mailed on Apr. 22, 2010 (22 pages).
PCT International Preliminary Report on Patentability for PCT Appln No. PCT/US2009/001698, mailed on Sep. 30, 2010 (14 pages).
PCT International Search Report and Written Opinion for PCT Appln No. PCT/US2010/038409, mailed on Dec. 21, 2010 (11 pages).
PCT Invitation to Pay Additional Fees and Where Applicable, Protest Fee (PCT Article 17(3)(a) and Rule 40.1 and 40.2(e)) for PCT/US2009/001698, Aug. 19, 2009, (8 pages).

(56) References Cited

OTHER PUBLICATIONS

Invitation to Pay Additional Fees for PCT Application No. PCT/US2012/065924, mailed on Feb. 4, 2013 (6 pages).
Invitation to Pay Additional Fees for PCT Application No. PCT/US2012/065925, mailed on Mar. 15, 2013 (4 pages).

PCT International Search Report and Written Opinion for PCT Application No. PCT/US2012/065924, mailed on May 27, 2013 (20 pages).
The State Intellectual Property Office (SIPO) of People's Republic of China Search Report for Chinese Application No. 200980117925.1, mailed on May 29, 2013 (1 page).

* cited by examiner

Tag System Block Diagram

Tag Transmitter Schematic

TOP VIEW

SIDE VIEW

TOP VIEW

SIDE VIEW

SECTION AA

TOP VIEW

SIDE VIEW

TOP VIEW

SIDE VIEW

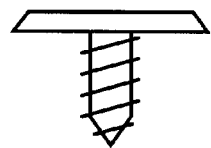 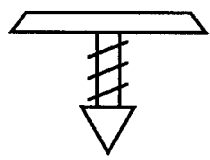 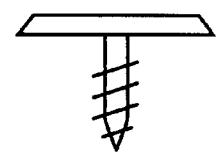
FIG. 15A  FIG. 15B  FIG. 15C
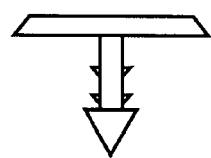 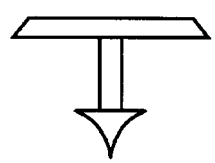
FIG. 15D  FIG. 15E
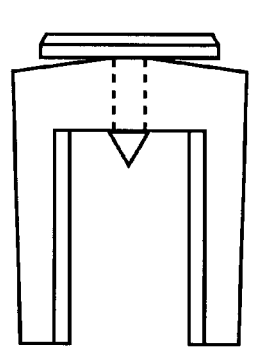 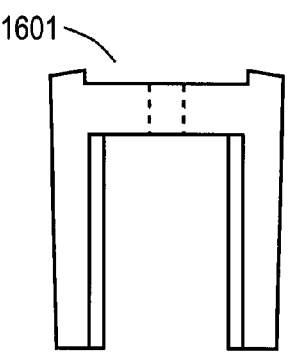 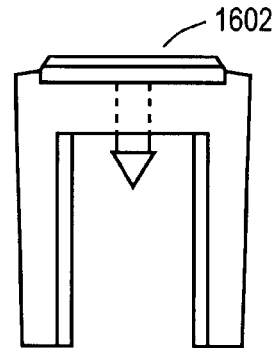
FIG. 16A  FIG. 16B  FIG. 16C

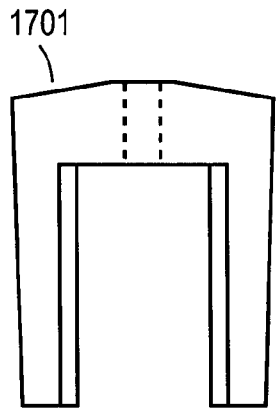
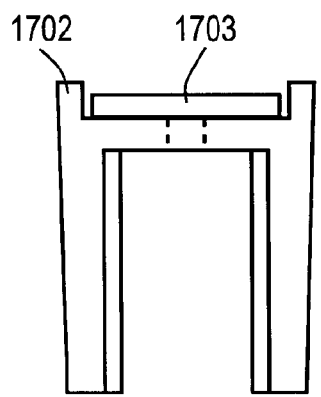
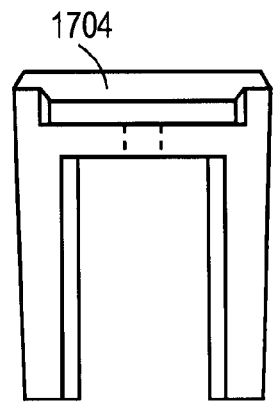
FIG. 17A  FIG. 17B  FIG. 17C
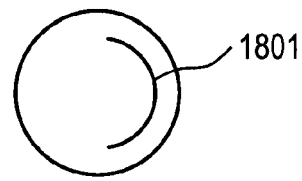
FIG. 18A
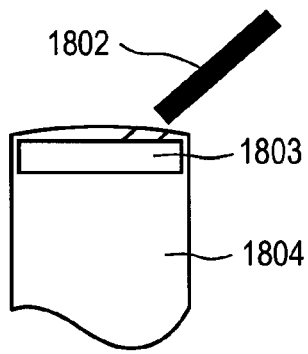
FIG. 18B
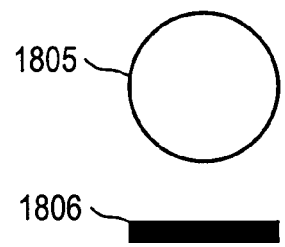
FIG. 18C
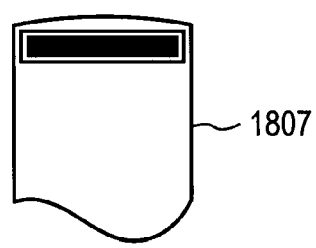
FIG. 18D

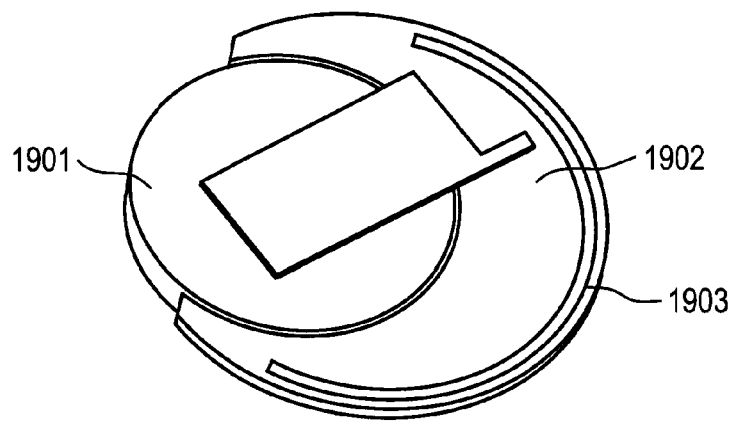
FIG. 19A
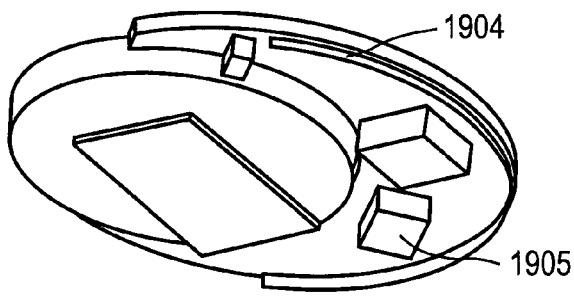 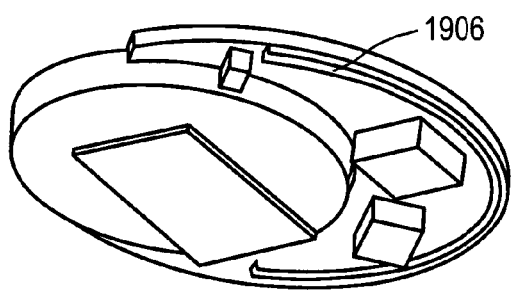
FIG. 19B          FIG. 19C
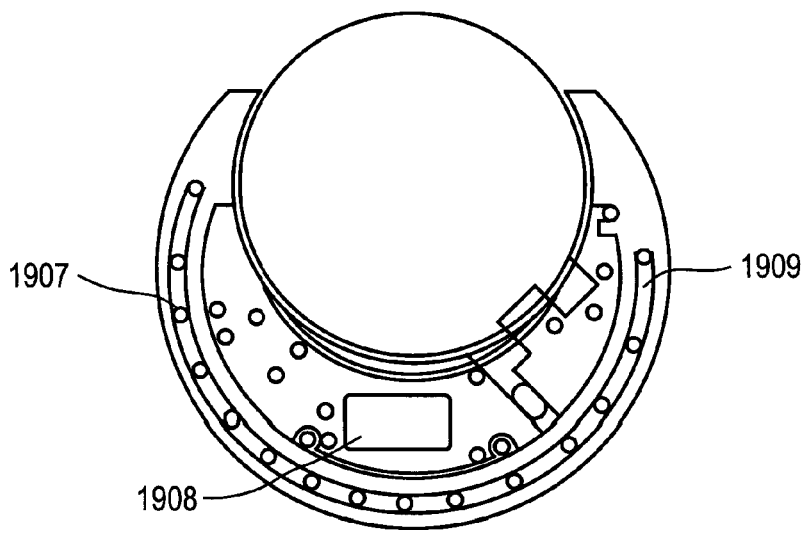
FIG. 19D

GOLF CLUB APPARATUSES AND METHODS

This application claims the benefit of U.S. Provisional Patent Application No. 61/186,771, filed Jun. 12, 2009, and this application is also a continuation-in-part of and incorporates by reference U.S. patent application Ser. No. 12/405,223, filed Mar. 16, 2009 now U.S. Pat. No. 8,226,495 entitled "Golf Data Recorder With Integrated Missing Club Reminder and Theft Prevention System," which claims the benefit of U.S. Provisional Patent Application No. 61/037,305, filed Mar. 17, 2008, which is hereby incorporated herein by reference.

FIELD OF THE INVENTION

The present invention relates to the game of golf or other games, and more particularly to an improved golf data collecting and recording system and a system for reminding golfers when a club has been mistakenly left behind on the golf course and a system for notifying the golfer if a club or golf bag has been removed without authorization.

BACKGROUND OF THE INVENTION

Golf Data Recording Function

GPS rangefinders are popular in the game of golf. GPS rangefinders are used to inform the golfer of the golfer's location on a golf course relative to the location of other mapped areas of interest on the course (e.g. sand traps, greens, etc.) GPS rangefinders are typically available in either cart-mounted or handheld versions.

Examples of popular cart-mounted GPS rangefinder products include Prolink and UpLink. Examples of popular handheld GPS products include the SkyCaddie by SkyHawke and Golflogix, to name a few. A potentially valuable feature of handheld GPS rangefinders is the ability for the golfer to "mark the location" of the ball and other areas of interest. With existing handheld systems the golfer is able to press a button on the handheld devices to mark the location of the ball. Similar technology could be implemented in cart-mounted GPS systems, but the handheld systems have the advantage of the golfer being able to walk to the actual location of the golf ball to mark the location. Often golf carts are restricted to "cart path only" access on a golf course and it is often not practical to drive a golf cart to the actual location of a golf ball due to the terrain.

Marking the location of the ball provides valuable information to the golfer. The current handheld systems operate in approximately the following manner: When the golfer hits the first (tee) shot of a hole the golfer presses a button on the handheld device instructing the device to "mark the spot" where the drive was hit. The device records the GPS coordinates of the first shot. The golfer may manually enter, through a manual input interface, other information on the device such as: type of club used (e.g. driver, 5 iron, etc.), type of contact made with the ball (e.g. hook, slice, straight), wind conditions, etc. The current method to enter such data consists of the golfer making selections on the device by pressing buttons, selecting items from drop down menus, etc.

After the golfer hits the first shot, records the location of the first shot and enters data about the first shot the golfer approaches the ball at rest for the next shot. If the golfer follows the same pattern as the first shot (i.e. hitting the ball, marking the spot of the shot on the device, entering other information) the GPS system can store and display the locations of the first and second shots and calculate the distance of the first shot. If this pattern is continued for every shot of the round the golfer would have very valuable data about the golf round including: distance of all shots, locations of all shots and (if entered), type of contact made on all shots, wind conditions for all shots, etc. The golfer would also know the number of strokes taken per hole which (if accurately recorded) would be the golfer's score for the round. However golfers seldom use the features because the process of manually entering data is too labor intensive on a golf course and will lengthen the duration of each golf shot, causing delays in the game. Further, if a data collection system requires action by the golfer it is likely the golfer may forget to take action on every stroke. If the golfer forgets to take action to record a stroke or multiple strokes the system provides the golfer inaccurate data. Further, if the golfer attempts to return to the approximate location where the golfer forgot to record the golf stroke this would result in further slowing down of play which is bad for the game of golf. Patents exist that describe GPS systems with methods for collecting and managing data. Both U.S. Pat. No. 6,582,328 (Golflogix) and U.S. Pat. No. 7,118,498 (SkyHawke) describe such systems that require the golfer to enter golf shot data.

The problem with existing systems is golfers do not want to manually record the data for golf strokes into a handheld device. It is inconvenient for golfers to take the time to look at a handheld device, press buttons, select from drop-down lists, etc. to record information about every golf shot. One could say it is impractical for golfers to do so. Further, if golfers took the time to enter data in such a manual manner it would result in slower play which is not good for the golfers or the golf courses. It is desirable to have a completely automatic system for collecting golf data. U.S. Patent Application No. 60/949,458 describes such a system. The system described in this patent application includes means of detecting motion of the golf ball to confirm when an actual golf stroke has occurred. Such a system requires modification to the golf ball.

The problem of requiring the golfer to enter data manually is known. U.S. Pat. No. 7,121,962 and U.S. Patent Application Nos. 2007/0135237 and 2007/0129178 (all by Reeves) teach solving the problem using telemetry equipped golf clubs. The solutions taught by Reeves are impractical and fail to address all the issues required to accurately collect and record golf data. Reeves teaches entering data on a handheld device to record golf data, which is not good for the game because it would slow down play. Reeves teaches golf clubs with unique holes in or near the club head that make unique whistling sounds during the golf swing to identify each club. This approach is not practical due to variations in swing speed, wind and other noise variations that would make the system unreliable. Reeves teaches the use of a microphone housed in the handheld device to hear the clicking sound when the club hits to the ball to record the location of the stroke. This does not take into account practice shots between holes and other clicking sounds when clubs hit objects and would be prone to errors. Further, Reeves teaches requiring expensive and sophisticated electronics on the golf club (i.e. motion detector, and accelerometer). The expense of such components makes for an impractical solution.

U.S. Pat. No. 6,030,109 teaches a system for counting strokes automatically by detecting the distinctive sound made by a ball contacting the club face during a hit. The system disclosed seems to be problematic and potentially ineffective for several reasons. Similar to Reeves, this patent confirms a golf stroke by the sound made by the club striking the ball. Because golfers will often hit balls between holes for practice and hit other objects that might sound similar to hitting a ball the system will be prone to errors. A further potential problem relates to the insensitivity to a very gentle putt that generates no characteristic sound pattern. Finally, this system requires the golfer to wear an ankle strap with a microphone in it which golfers will likely not want to wear.

US Patent Application No. 2006/0270450 teaches a voice activated system for collecting and recording golf data. This system requires action (verbal instruction) by the golfer for each golf action to be recorded. Therefore the system does not automatically record golf data. Golfers may not like having to speak instructions for every action to be recorded. Further, golfers may forget to verbally instruct the recording of golf strokes which could result in attempts to return to locations where data was not recorded, slowing down play.

U.S. Pat. No. 7,143,639 and US Patent Application No. 2005/0272516 teach a golf launch monitor that uses RFID tags in golf balls and golf clubs to automatically identify the clubs and balls and to trigger a camera-based launch monitor system. U.S. patent application Ser. No. 10/672,365, filed Sep. 26, 2003 teaches passive RFID in golf balls and the identifying of such golf balls by a RFID reader.

Other examples of related prior art for golf data collection and management systems include: U.S. Pat. Nos. 6,705,942, 5,086,390, 4,910,677, 5,127,044, 5,283,733, 5,298,904, 6,908,404 and US Patent Applications 2002/0177490, 2002/0004723, 2001/0045904, 2002/0188359, 2005/0268704, 2005/0272516 and 2004/0147329.

Golf data collection systems will provide golfers with rich data about their golf game but existing systems and systems taught in the prior art above have shortcomings or challenges. The systems described above require either: 1) a modification to the golf ball, 2) expensive and sophisticated electronics on the golf club, 3) the golfer remembering to take an action to record every golf stroke (without a reminder) and 4) the golfer wearing an ankle strap with a microphone in it which golfers will likely not want to wear. Some of the prior art systems have technical challenges, such as relying on sound made by the club striking the ball to record every stroke—which may not be technically feasible for all strokes, particularly putts.

Golf Club Reminder Function

A golfer will commonly remove more than one club from their golf bag when considering how to make an upcoming shot. The golfer does this because they may be unsure of which club to use on the next shot. It is more convenient to have several clubs in hand when deciding which club to use vs. having to walk back to the golf cart for additional clubs. After choosing the correct club to use, the golfer may place the other clubs on the ground. After making the shot, the golfer may select the putter and walk towards the hole to putt the ball and not realize that he/she has left one or more clubs behind. It may then take the golfer a long time to realize that he/she has forgotten the misplaced club. Having to backtrack and reclaim the forgotten clubs slows down the game, is frustrating and may disturb those playing around the golfer.

There are several known approaches to solving the problem of mistakenly leaving golf clubs behind. Such systems are described in various U.S. Pat. No. 7,205,894 (Savage); U.S. Pat. No. 7,106,195 (Keays); U.S. Pat. No. 6,976,563 (Bormaster); U.S. Pat. No. 6,753,778 (Kruger); U.S. Pat. No. 6,411,211 (Boley et al); U.S. Pat. No. 6,366,205 (Sutphen); U.S. Pat. No. 6,118,376 (Regester); U.S. Pat. No. 6,057,762 (Dusza); U.S. Pat. No. 6,023,225 (Boley et al); 5,973,596 (French et al); U.S. Pat. No. 5,952,921 (Donnelly); U.S. Pat. No. 5,844,483 (Boley) and U.S. Pat. No. 5,565,845 (Hara) and U.S. Patent Application 2007/0191126 (Mandracken).

Some of these systems use distance between tagged clubs and readers to alert the golfer of a misplaced club; some use interrogating RFID transceivers mounted on the bag; some use loops around the opening of the golf bag that sense magnets passing through the loop and some use orientation sensors on the golf clubs. These systems may not be practical or effective for several reasons including: requirement of complex and expensive electronics in some cases; requirement of large amounts of power in some cases; potentially inadequate means of alerting the golfer in some cases. Therefore, there is need for a system that is inexpensive, does not require large amounts of power and effectively alerts the golfer when a club has been mistakenly left behind.

Theft Prevention Function

Golf equipment, specifically golf clubs and golf bags, can be very expensive. It is a known problem that golf equipment can be stolen. Often, when golfers finish playing a round of golf they will leave their golf equipment near the clubhouse, unattended, while they eat a meal, review their golf round with friends, etc. There is a need for a system that will notify a golfer when his or her golf equipment is moved without their authorization. Ideally, such system will help the golfer retrieve their golf equipment if stolen.

There are known approaches to solving the problem of alerting the golfer when their golf bag is moved without authorization. Such systems are described in U.S. Pat. No. 7,205,894 (Savage) and U.S. Pat. No. 5,041,815 (Newton). There is a need for a system with improved functionality over the known art.

SUMMARY OF THE DESCRIPTION

The following describes additions to U.S. patent application Ser. No. 12/405,223 and should be understood to be in the context of the prior application which is incorporated herein by reference. This application includes additions and potential modifications to the club tag and the system including, for example, the following: club tag light pipe configurations, light sensing algorithms used to determine whether a golf club is in or out of a golf bag, club tag aesthetics and housing design, club tag antenna configurations, and system automation techniques. This application focuses on one embodiment which includes a "dual light sensor" approach with two light sensors in each club tag—one sensor configured as a light switch and one sensor configured as a light meter.

Light Pipe Configurations

The club tag housing is designed to allow light to reach the light sensors. In one embodiment the top part of the housing serves as a light pipe that allows light to reach the light sensors. The light pipe can be configured to control the amount of light that reaches the light sensors. For example, the light pipe can be configured to only allow light in through the sides of the light pipe as shown in FIG. 2. The light pipe can be configured to diffuse or reflectively diffuse light received by the light pipe and direct the diffused light toward one or both of the light sensors.

Controlling the amount of light that enters the light sensors (light switch and light meter) limits the wide variations between bright light readings. Limiting the amount of direct sun exposure to the light sensors allows for less drastic changes in light which can simplify the algorithms used to determine inbag or out-of-bag status. The light can be limited by diffusing it or reflectively diffusing it or by the use of a neutral density filter, etc.

Light Sensing Algorithms

The club tags use algorithms, in one embodiment, to determine whether the tag is in or out of the golf bag. These algorithms use information from the light sensors. For example, a fixed threshold between dark and light is used by the light switch to determine in-bag or out-of-bag status in some situations. The light switch and light meter can also be used in combination to determine in-bag or out-of-bag status. The club tag can use variable thresholds calculated by using the light meter measurements and various averages of light meter measurements.

Club Tag Aesthetics and Housing Design

This application includes various potential club tag design configurations. Also included is the concept of a golf grip that is designed specifically to receive a club tag, thereby improving the aesthetics and creating a more finished-looking product when the club tag is installed on the golf club grip. The configurations included in this application are only typical embodiments of the invention and are not therefore to be considered to be limiting of its scope.

Club Tag Antenna Configurations

The club tag antenna can be modified to be in different locations on the tag. The location of the antenna may have an impact on antenna performance. Removing the antenna from the printed circuit board frees up space for electrical components and allows for a smaller printed circuit board. Other potential impacts of different club tag antenna locations are discussed herein.

System Automation Techniques

Ultimately a system, in one embodiment, used to collect golf data will be fully automated, requiring no out-of-the-ordinary action by the golfer. This application discusses system configurations that are semi-automated as well as fully automated.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 15A-15E show various configurations for the post on the club tag.

FIGS. 16A, 16B and 16C show three side view cross sections of a golf club shaft and golf club grip with the golf club grip molded with a recess designed to receive a club tag.

FIGS. 17A, 17B and 17C show three side view cross sections of a golf club shaft and golf club grip with the golf club grip molded with a recess designed to receive either a club tag printed circuit board assembly or a club tag and a cover piece designed to attach over the club tag.

FIG. 18A is a top view of a golf club grip with a slit in it designed to receive a club tag.

FIG. 18B is a side view cross section of a club tag and a golf grip designed to receive the club tag through an opening in the golf grip.

FIG. 18C shows a top view and side view of one embodiment of a club tag.

FIG. 18D is a side view cross section of a club tag inside a golf grip designed to receive the club tag through an opening in the golf grip.

FIGS. 19A-19D show various views of a club tag printed circuit board assembly with various antenna designs.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

System Overview

Figure 5:
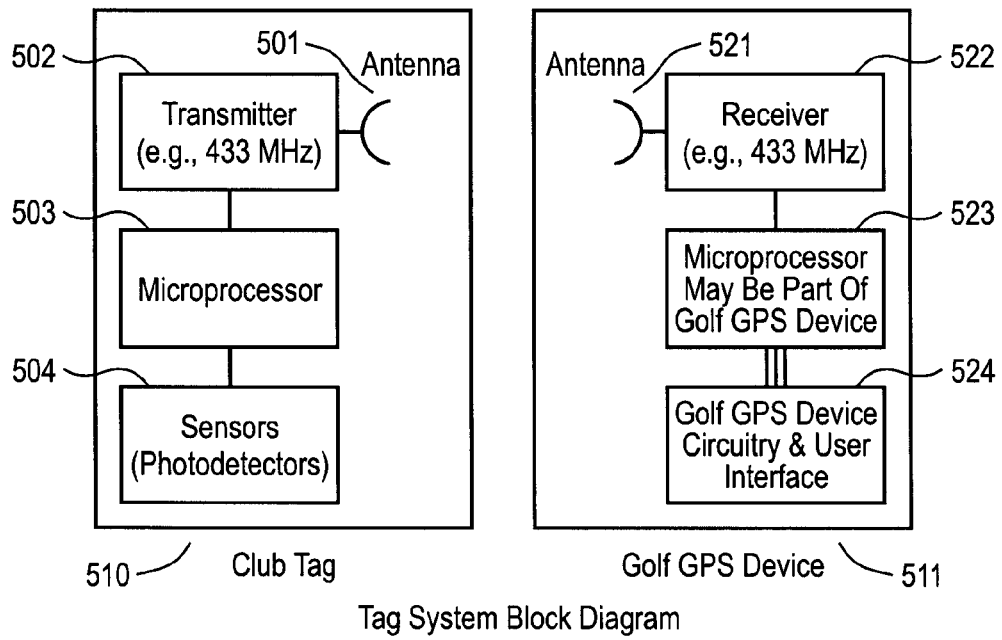
FIG. 5 is a block diagram for the club reminder and golf data collecting system.

As shown in FIG. 5, one embodiment of the club tag system consists of at least one club tag 510 and a receiving device, such as a golf GPS device 511. The club tag includes transmitter 502 operating at for example 433 MHz, an antenna 501, a microprocessor 503, and at least one sensor 504, for example one or more light sensors. The golf GPS device includes at least one antenna 521, a receiver 522, a microprocessor 523, and golf GPS circuitry and user interface 524. The golf GPS circuitry, user interface and microprocessor (or other processing system) may include functions for both the club tag function and golf GPS functions. The club tag information is used to implement golf data collection or missing club reminder functionality or both. For the golf data collection function, the club tag provides information, such as identifying a club used for a golf stroke. For the missing club reminder, the club tag provides information about which clubs are out of the golf bag. The golf GPS functions use position information (e.g. latitude and longitude obtained from a GPS receiver) and golf course maps to provide distance and other information to a golfer. Other examples of a receiving unit which receives RF transmissions from a club tag include those units shown in FIGS. 15, 17A, 17B, and 29 of U.S. application Ser. No. 12/405,223.

Figure 6:
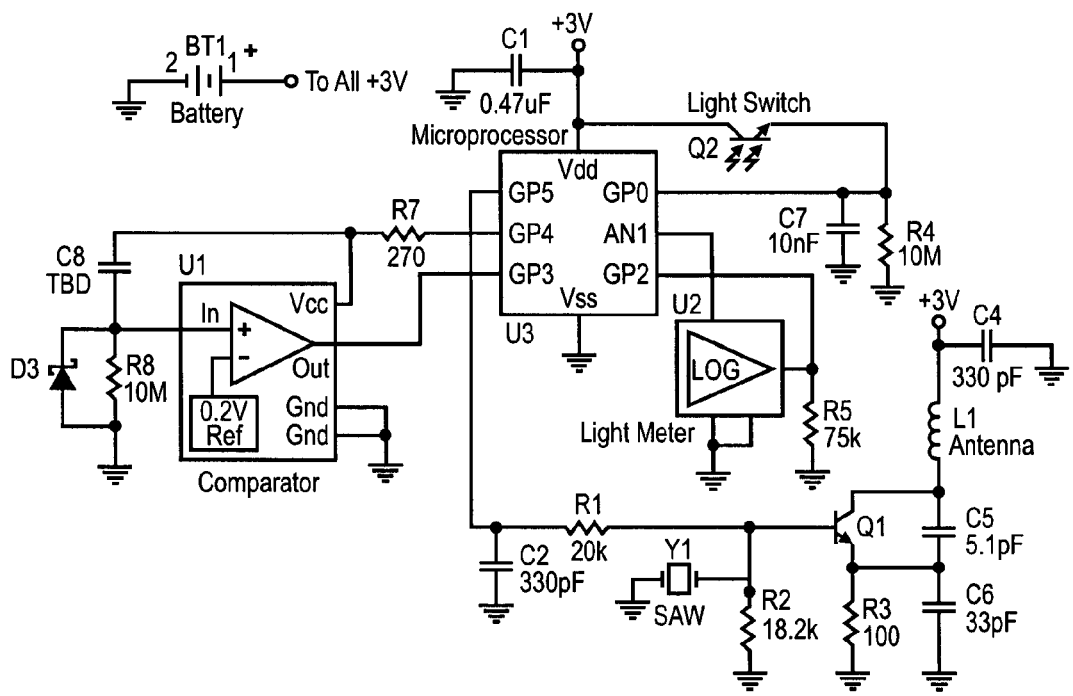
FIG. 6 is a schematic diagram for one embodiment of the club tag.

The embodiment of a tag shown in FIG. 6 is one example of a club tag; other examples of a tag are shown in FIGS. 16A-16C in U.S. application Ser. No. 12/405,223 and are described in conjunction with those figures. Referring to FIG. 6, the tag includes, in this embodiment, an antenna L1, two light sensors Q2 and U2, a microprocessor U3, a timer U1, and a battery BT1. A surface-acoustic wave (SAW) resonator Y1 provides, in this embodiment, the frequency source for the transmitter. The SAW resonator, the transistor Q1, and corresponding components make up an oscillator that operates at, for example, 433 MHz. This oscillator is, in this embodiment, turned on and off by microprocessor control (component U3), creating an on-off keyed (OOK) modulated signal. The antenna can be a trace on the printed circuit board. The inductance of this trace contributes to the tuning of the oscillator.

It will be understood that the tag and/or the receiving unit can include processing logic or a processing system that can implement the functions and methods described herein, and it will be understood that the processing logic or processing system can be provided by any one or more of hardware, or a combination of hardware and software, in the form of an ASIC (Application Specific Integrated Circuit), a microcontroller, or a microprocessor or a combination of these elements.

It will also be understood that a club tag or tag can be manufactured and assembled with a golf club and sold to a retailer or other distributor with the tag already in place in the golf club before being sold or provided (e.g. rented) to an end user (golfer) or the tag can be added by a golfer after the golfer obtains a club that does not have a tag. It will also be understood that a golf rangefinder can be a cellular telephone or a PDA (Personal Digital Assistant) or a tablet computer or a smartphone or other consumer electronic devices that can provide at least one of the functions of a golf rangefinder (such as, a golf club reminder function or a golf data recording function or a GPS function, etc.). It will also be understood that GPS (Global Positioning System) is one of the available systems that can provide a location through satellites and that SPS (Satellite Positioning System) includes GPS, Glonass and other satellite systems and also non-satellite systems (such as cellular telephone tower triangulation or pseudolites arranged on a golf course, etc.).

Light Pipe Configurations

Figure 1:
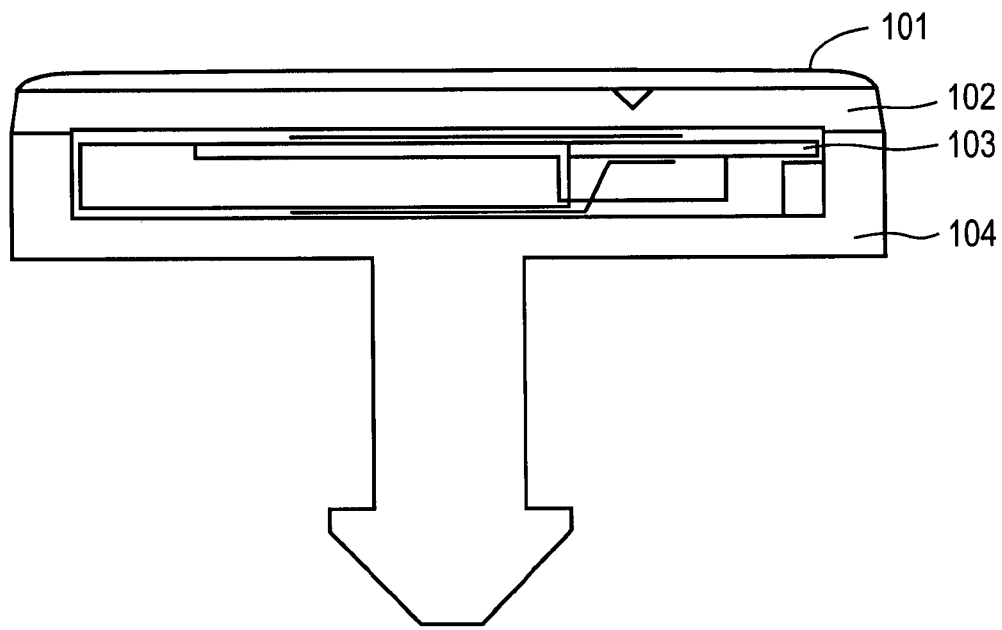
FIG. 1 shows a side view cross section of one embodiment of a club tag.
Figure 2:
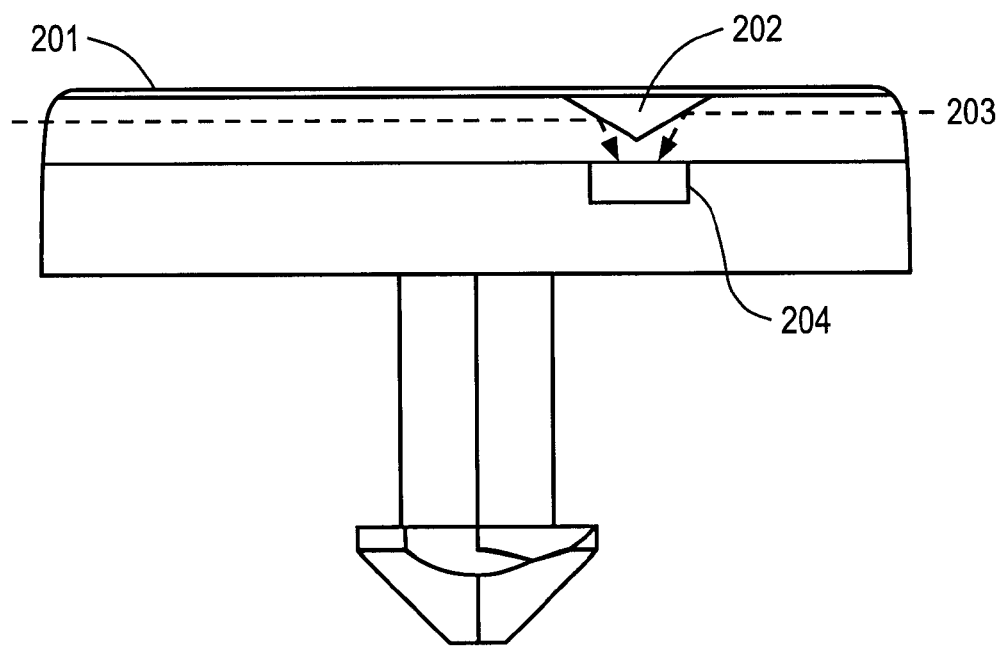
FIG. 2 shows a side view cross section of one embodiment of a club tag illustrating light entering from the sides of the light pipe and reflecting off a light concentrating feature into the light sensors.

FIGS. 1 and 2 show one typical embodiment of a club tag. The club tag electronics/printed circuit board assembly 103 are housed within a bottom housing part 104 and a top housing part. For the configuration shown in FIG. 1 the light pipe 102 and the cover 101 combine to be the top housing piece for the club tag electronics. FIG. 2 depicts how a light pipe can control the amount of light that reaches the light sensors 204. Controlling the amount of light that enters the light sensors (light switch and light meter) limits the wide variations between bright light readings. For example, the light level reading at full-sun midday could be approximately 100,000 Lux, and in the shade could be 10,000 Lux. Although this is a significant change in the light level readings, both readings are obviously outdoors and there is no need to differentiate between 100,000 Lux and 10,000 Lux. Limiting the amount of light that enters the tag reduces the dynamic range required to process that light meter data. An analog-to-digital converter is used to process light meter data. Limiting the dynamic range allows for use of an 8-bit analog-to-digital converter instead of, for example, a 10-bit analog-to-digital converter, offering less complex processing and reduced component cost. Light pipes that allow the light to enter from 360 degrees provide for light meter readings that are averaged, versus readings that are from direct line-of-sight light sources such as the sun. Additionally, light sensors use more current for brighter readings, and battery life is conserved by not making readings at very high light levels.

There are various techniques to limit the light that enters the tag, and there are also techniques for focusing or concentrating the light that does enter the tag.

One technique for selectively illuminating the light sensors is to allow the light 203 to enter at the sides of the club tag only; not through the top. This can be accomplished with a clear acrylic or plastic piece 102 with a solid-colored piece (101 and 201) on the top above the frame or housing 104 provided by a tag. The plastic piece 102 could be transparent or translucent. The underside of the solid colored piece could be white or metallic which offers improved reflection of the light that enters through the sides. In one embodiment, the underside of the solid colored piece has a white diffusively reflective surface which diffusely reflects (e.g. scatters) light. The top colored piece could be a dark color or opaque such that light is not allowed to pass through. The light enters along side of the entire circumference of the clear piece 102 and is reflected inside the thickness of the clear piece 102.

Figure 3:
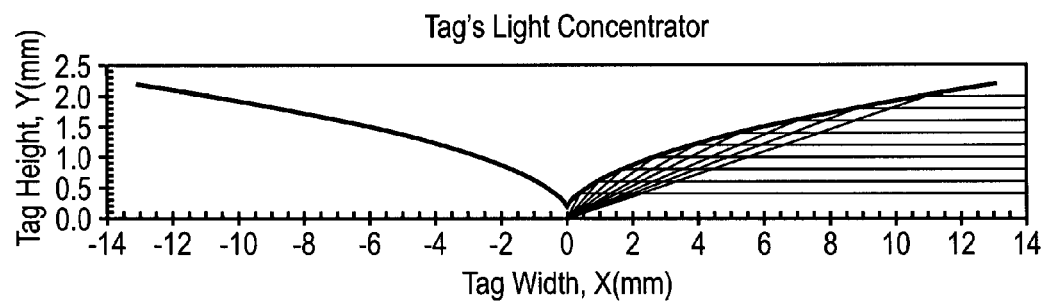
FIG. 3 shows one embodiment of a potential shape of a light concentrating feature for the light pipe.

Another technique for illuminating the light sensors is to focus the light that enters the tag onto the light sensors 204. This can be achieved by incorporating one or more light focusing or concentrating features 202. The light focusing feature could be in the form of a parabolic dimple, a hole or a countersink (as shown in FIG. 2) or other feature that directs light to the light sensors. Optionally, this feature could be filled with a material to direct the light. This material could be epoxy, silicone, or other material and may include reflective pieces such as glitter or metallic chips. Alternatively, metallic ink or paint may be used on the surface of the light focusing feature 202 or on the underside of the top cover 201. Another technique to focus the light onto the sensors is to use a parabolic shaped dimple that focuses incoming light onto a precise spot, as shown in FIG. 3.

Figure 4:
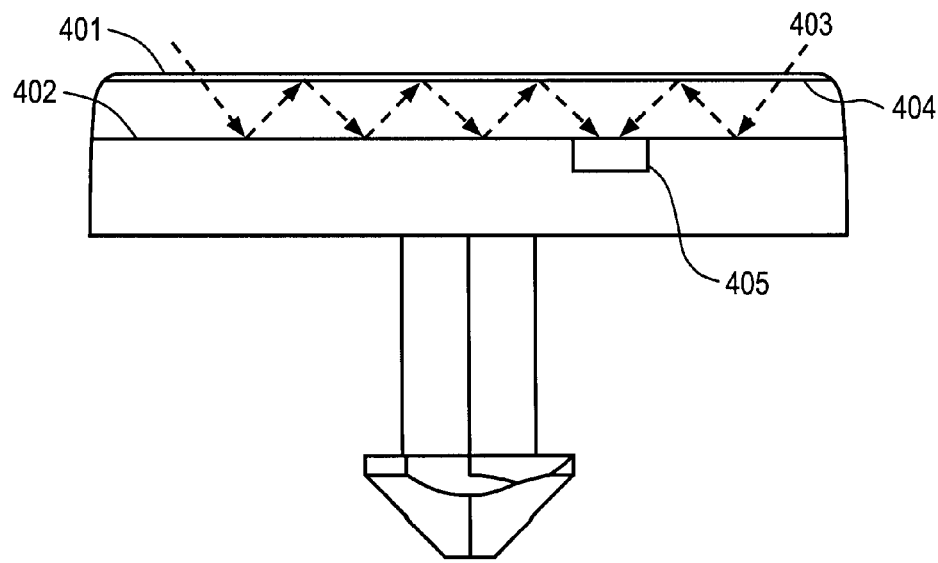
FIG. 4 shows a side view cross section of one embodiment of a club tag illustrating light entering from the top of the light pipe and reflecting off the inside walls of the light pipe into the light sensors.

Referring to FIG. 4, there are other techniques for selectively illuminating the light sensors 405. One example is to include small areas in the top cover of the tag that allow light to pass through. The cover 401 is a substantially solid colored or opaque cover with clear areas 403 (e.g. transparent pin holes in the cover 401) that allow light to enter and reach the lights sensors 405 in selective areas such that the light is not directly reaching the light sensors. The underside 404 of the cover 401 could have a reflective surface, such as white colored or metallic, allowing the light to reflect inside the clear plastic or acrylic cover 402. The reflective surface can be a diffusively reflective surface so that it scatters the light upon reflection.

The light sensors can be mounted so that their sensor area points directly upwards toward the cover. The light sensors can be mounted on a single side of the printed circuit board with sensors pointing away from the printed circuit board. Alternatively, referring to FIG. 19D, the light sensors can be mounted on a single side of the printed circuit board with the light sensing elements of the light sensors protruding through an opening 1908 in the printed circuit board. Another option is to mount the light sensors so that their sensor areas point toward the sides of the tag.

Light Sensing Algorithms

Light Switch and Light Meter Operation

The club tags can use algorithms to determine whether the tag is in or out of the golf bag. These algorithms use information from the light sensors (such as, for example, one light switch and one light meter) in the club tags.

In one typical embodiment, initially the club tag is in a deep sleep mode, with its microcontroller in sleep mode and power to the light meter turned off. The light switch has a fixed threshold for light level readings that is very low, such as less than 10 Lux. A change to the light switch wakes up the microcontroller. The microcontroller turns on a timer, and uses pulses from the timer to periodically turn on the light meter circuit and take light level readings. The microcontroller processes these readings, making decisions about light/dark status of the tag and in/out of the bag status. If it is determined that a significant change in light occurred, the microcontroller enables the transmitter to send data and status. The timer controls the interval between the transmit bursts, and after a predetermined number of bursts or length of time, the transmitter is disabled. In one preferred embodiment, while the light switch senses light, the timer continues to prompt the microcontroller to take light meter readings and the microcontroller watches for significant changes in light readings. If the microcontroller determines that a significant change in light level has occurred, it uses the timing pulses from the timer to send out a series of transmissions.

When the light switch indicates "light", the light meter continually takes light level readings. A significant decrease in light, as determined by the algorithm within the microcontroller, will cause the microcontroller to issue a transmission indicating a transition to dark, even if the light switch indicates otherwise. The light switch is set to switch at a very low light reading, such as 10 Lux. It is possible for the light switch to not switch to dark when inside a golf bag if the bag is light colored or translucent. In these cases, the light switch reads light, and the light meter continually takes light level readings. The light meter readings are evaluated to determine if a significant change in light has occurred. Based on this information the microprocessor determines the in-bag or out-of-bag status.

When the light switch indicates "dark", the microcontroller enables the transmitter to send the "dark" data and status with multiple transmissions separated by intervals determined by the timer. In between multiple transmissions, the microcontroller continues to take light meter readings to confirm that the tag remains in the dark; if not it transmits a transition to light sequence. After the sequence of transmissions indicating a transition to dark, the tag circuit is returned to a deep sleep mode.

Optionally, the club tag can be configured to transmit multiple in-bag transmissions, confirming that the club has been returned to the bag. Multiple in-bag confirmation transmissions may be helpful in some scenarios. For example, if a golf club is dropped into tall grass it could potentially be dark enough for the club tag to mistakenly report in-bag status. When the golfer leaves the area the golfer will eventually be out of range to receive the subsequent transmissions confirming in-bag status.

Algorithms in one embodiment evaluate light meter readings and store average light meter readings to better determine light/dark status of the particular tag in a particular type bag. This averaging of dark (in-bag) and light (out-of-bag) light meter readings allows the tag to gradually learn the characteristics of the environment within an individual golfer's golf bag as well as the ambient light conditions of each particular golf game.

If the light switch detects a change in light level over or under a predetermined threshold, such as 10 Lux, the light switch wakes up the microcontroller. If the light switch detects a light level greater than the predetermined threshold (indicating light), the microcontroller reports that status of the tag is out-of-bag in some situations. If the light switch detects a light level less than the predetermined threshold (indicating dark), the microcontroller reports that status of the tag is in-bag.

When the light switch indicates light or out-of-bag status, the light meter is activated. An internal timer wakes up the microcontroller at predetermined intervals. For example, these intervals can be at 7.5 seconds, 4 seconds, 1 second, etc. The microcontroller prompts the light meter to take light level readings at these predetermined intervals. Optionally the light level readings can occur at integer multiples of the predetermined timing intervals, not at every timer wake-up. The light meter continues to take light level readings at intervals until the light switch is returned to dark or in-bag status. When the light switch changes to dark or in-bag status, the light meter takes light level readings at predetermined intervals for a fixed amount of time set by a clock in the microprocessor, for example 1 minute. After this fixed amount of time has elapsed, the light meter ceases to take readings until the light switch indicates light or out-of-bag status.

Algorithm Parameters

In one typical embodiment, the microcontroller algorithm uses the following parameters to determine in-bag versus out-of-bag status:

Meter: Current light meter reading, taken every time the microcontroller wakes up, either from its internal timer or a change in light switch reading (dark to light or light to dark)

Average: Exponential (weighted) average of all light meter readings.

Bright Average: Exponential average of light meter readings taken when microcontroller determines tag is out-of-bag.

Dark Average: Exponential average of light meter readings taken when microcontroller determines tag is in-bag.

Difference: The difference between the current light meter reading and the Average of the light meter readings. Difference=Meter−Average Change: Equal to the Average light meter value divided by 4, but never less than 16 LSBs. Change=Average/4 but not less than 16

Threshold: A numerical value halfway between the Bright Average and the Dark Average. (Bright Average+Dark Average)/2

Algorithm Flow Diagram

Figure 7:
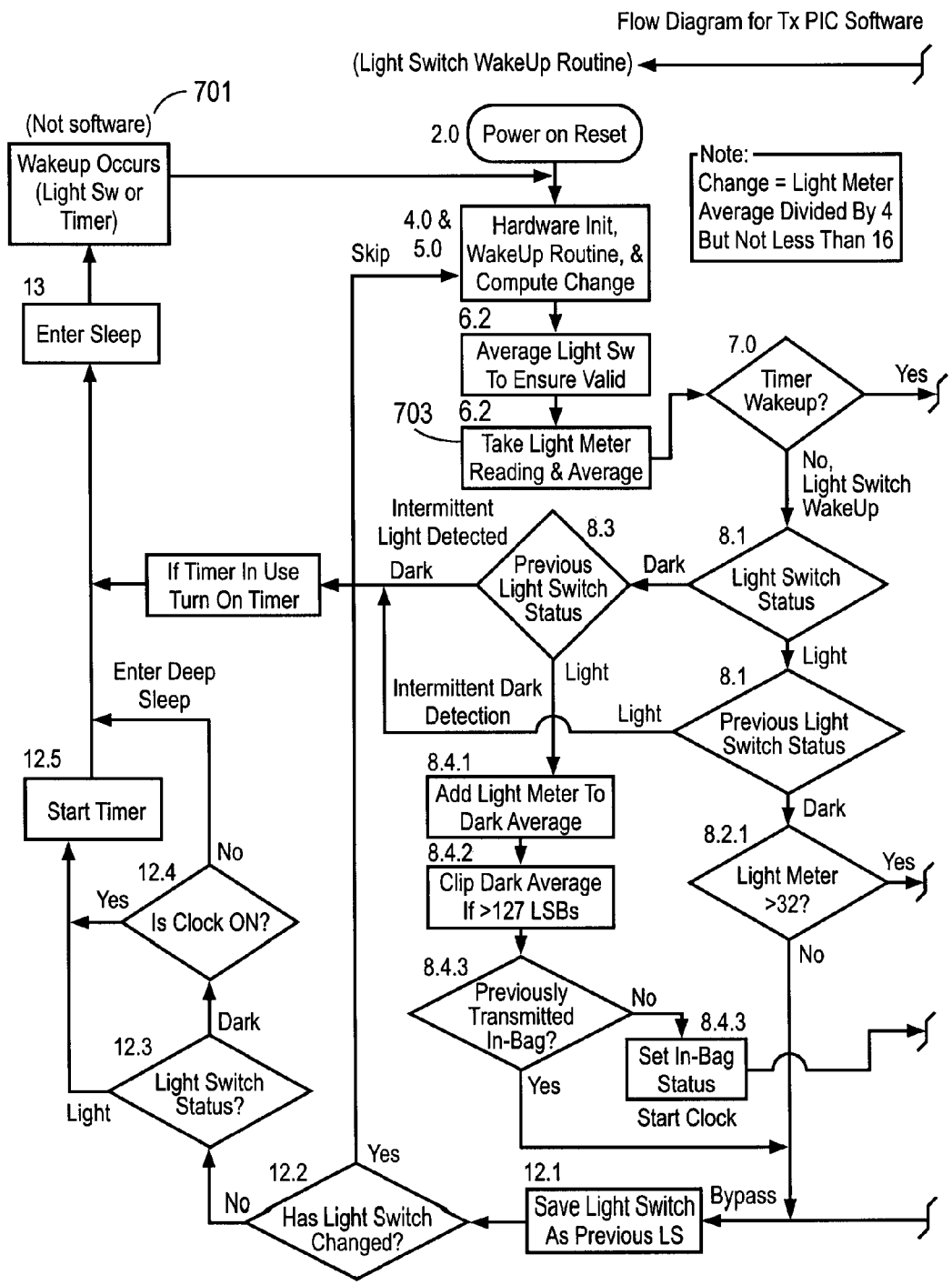
FIG. 7 is a software flow diagram for the microprocessor in one embodiment of the club tag.
Figure 7:
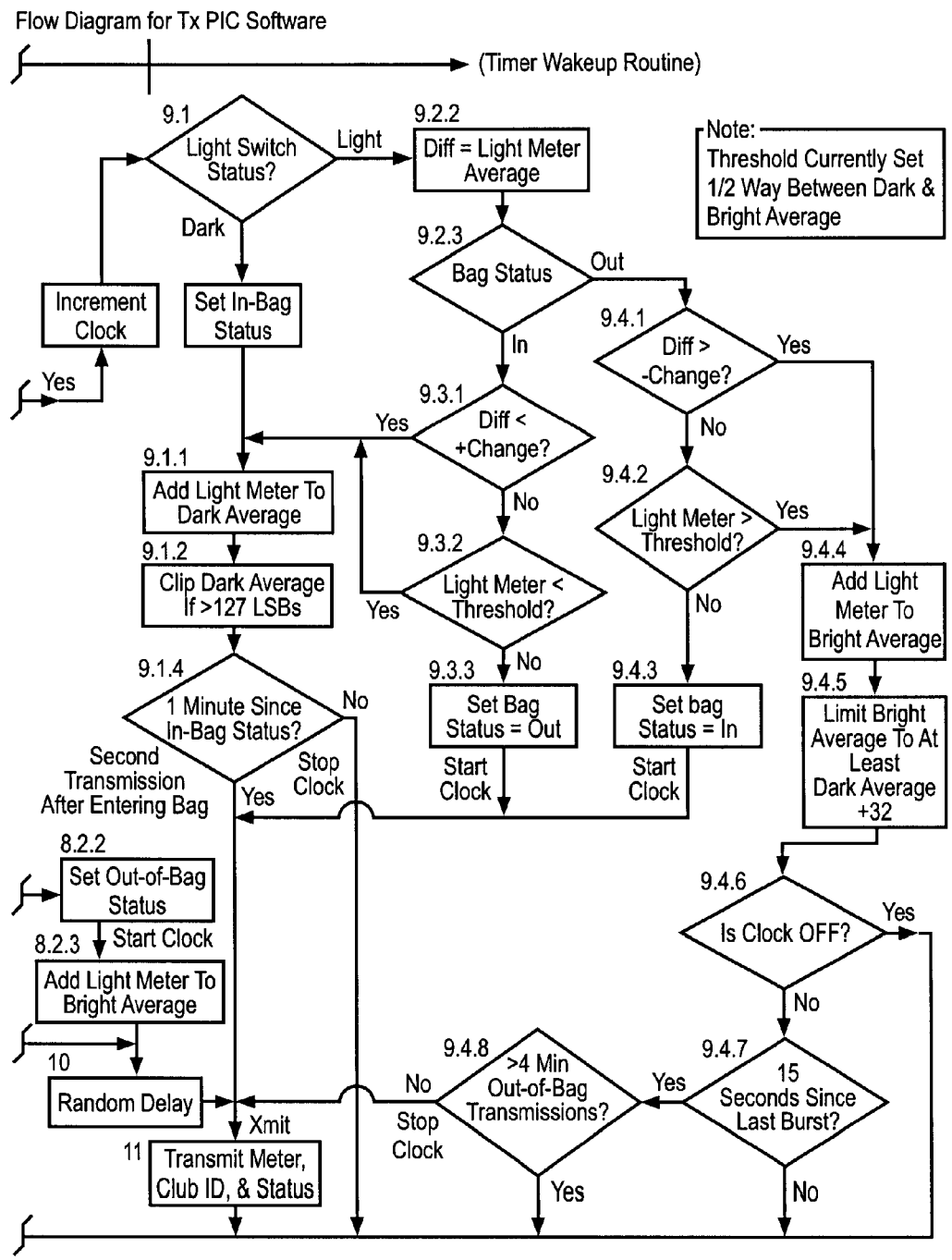

A specific embodiment will now be described, in conjunction with FIG. 7, as an example of a method of the present invention, and other alternative embodiments can employ different operations and different parameters, in a different sequence, etc. in a manner that is consistent with a general method of the invention. Referring to the Flow Diagram in FIG. 7, the tag is awakened from sleep 701 by either a change to the light switch or a prompt by the timer. The processing from the wakeup starts in block 4.0 and 5.0. The processor averages the light switch reading and directs the light meter to take a reading in block 6.2.

If the processor was awakened by a change in the light switch, the processor assesses light switch status (light or dark) in block 8.1, and previous light switch status in blocks 8.1 and 8.3. Based on that information, the processor determines if the status should change to out-of-bag or in-bag (blocks 8.4.3 and 8.2.2) and adds light meter reading to Bright Average (block 8.2.3) or Dark Average (block 8.4.1). The processor then transmits the tag data and status (block 11).

Using the light meter to determining IN or OUT of bag is, in one embodiment, a two-part process, consisting of:

Part 1: Light meter takes light level reading 703, and microcontroller evaluates the change in light level.

If the current tag state is in-bag—If the Difference is less than the Change value (indicating a small increase in light), then the microcontroller updates the Dark Average (block 9.1.1) and goes back to sleep. But If the Difference is greater than the Change value (indicating a significant increase in light), then the microcontroller proceeds to Part 2.

If the current tag state is out-of-bag—If the Difference is less than the Change value (indicating a small decrease in light), then the microcontroller updates the Bright Average (block 9.4.4) and goes back to sleep. But if the Difference is greater than the Change value (indicating a significant decrease in light), then the microcontroller proceeds to Part 2.

Part 2: The microcontroller then compares the current light meter reading with the Threshold (blocks 9.3.2 and 9.4.2).

If the current tag state is in-bag—If the light meter reading is above the Threshold, then the tag transmits out-of-bag status (block 9.3.3), else it returns to sleep mode.

If the current tag state is out-of-bag—If the light meter reading is below the Threshold, then the tag transmits in-bag status (block 9.4.3), else it returns to sleep mode.

If the processor was awakened by a prompt from the timer, the light switch status is checked (block 9.1). If the light switch indicates light, the processor calculates the Difference, which is the light meter reading minus the Average (block 9.2.2). This Difference value is used to determine if the change was large enough to change the status of the tag to out-of-bag or in-bag. On the Flow Chart in FIG. 7, the paths through blocks 9.3.1-9.3.2-9.3.3 and 9.4.1-9.4.2-9.4.3 compare the Difference value to a Change value, which is the Average value divided by 4, for example, and to a Threshold, which is, for example, halfway between the Dark Average and Bright Average. The result is that the status is changed when the Difference is greater than, for example, a 25 percent change in the Average value, and also the light meter value crosses a Threshold set by both Bright and Dark Averages.

The Algorithm uses, in one embodiment, exponential averaging of light meter values to determine Bright and Dark Averages. The average is a running average which is exponentially weighted to give more weight to more recent readings. These averages change based on the levels of light in and out of the golf bag. Because of their inherent changes, it is desirable, in one embodiment, to put maximum and minimum limits around these averages. In the current embodiment, the Dark Average maximum is limited to 127 LSBs (least significant bits) in the analog-to-digital converter, as shown in blocks 8.4.2 and 9.1.2. The Bright Average minimum is limited to the value of the Dark Average plus 32 LSBs, as shown in block 9.4.5. In this way, the Dark Average is never greater than the Bright Average, and the threshold created from the two averages is in fact a value greater than the Dark Average and less than the Bright Average. These limitations on the values of Dark and Bright Averages guarantee valid threshold values and prevent error states in the microprocessor.

The Algorithm defines a minimum light meter value for a "light" reading or out-of-the-bag status as 32 LSBs in the analog-to-digital converter, as shown in block 8.2.1. In the current embodiment, the value of 32 LSBs as a minimum value to determine out-of-the-bag status gives valid readings for a wide range of user scenarios, including golfing at twilight and using a light-colored or translucent golf bag.

Club Tag Transmissions

The tag circuit includes a timer in one embodiment (for example, a relaxation oscillator or timing circuit) that pulses every 2 seconds, for example. The timer can be external to the microprocessor and is controlled by the microprocessor.

The microprocessor sets a clock to track the duration of repetitive transmissions. The clock counts the number of transmissions for the in-bag status and prompts the processor to cease transmissions after, for example, one minute of in-bag transmissions. The clock counts the number of transmissions for the out-of-bag status and prompts the processor to cease transmissions after, for example, four minutes of out-of-bag transmissions.

In-Bag: When the tag enters the bag, it transmits multiple times separated by intervals determined by the timer for a predetermined amount of time set by the clock. The multiple transmissions give a confirmation that the club is actually in the bag. After the last transmission, the microcontroller enters a deep sleep mode, unless the light switch still detects light. If the light switch still indicates light inside the bag, then the microcontroller goes into a light sleep mode, waking up at predetermined intervals, such as 2 seconds, to monitor light conditions and to keep updating the Dark Average and Average light meter readings.

Out-of-Bag: When the tag exits the bag, it transmits multiple times separated by intervals determined by the timer for a predetermined amount of time set by the clock. The intervals may be random delays. The multiple transmissions give continued confirmation that the club is out of the bag and guarantee that the message is received if the golfer is out of range and then walks into range. The first transmission can include a random delay between the light changing and the beginning of transmission for collision avoidance with other clubs with tags that are removed from the bag at the same time. After the last transmission, the microcontroller goes into a light sleep mode, waking up at predetermined intervals, such as 2 seconds, to monitor light conditions and to keep updating the Bright Average and Average light meter readings.

The advantage to having a variable threshold is that the system learns what is light and dark in the current environment, which may include varying light levels due to time of day, weather, color or translucency of golf bag. The Bright and Dark Averages are determined by exponential averagers, weighing the most recent readings more heavily than older readings. The variable threshold and the limits on the amount of change (Difference) prevent false in-bag status for significant changes, such as sunlight to shade. The variable threshold and averagers determine status based on outside light levels and operate for various light conditions, such as bright mid-day light and low-light twilight conditions.

One of the functions of the timer is to prompt the processor to do repeated transmissions of the same status information. Another function of the timer is to continually take light meter readings when the light switch is turned on. This guarantees accurate readings when the environment is too light for the light switch to turn off when the tag is actually in the golf bag.

Club Tag Aesthetics and Housing Design

Figure 8A:
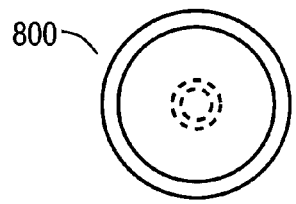
FIG. 8A shows a top view and FIG. 8B shows a side view of one embodiment of the club tag.
Figure 8B:
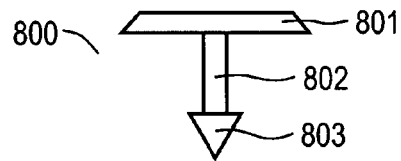

FIGS. 8A and 8B show a typical configuration of a club tag housing. A top portion 801 encases the electronics. A post 802 allows for the club tag to be attached to a golf club through a hole in the golf club grip. A securing feature 803 is included at the end of the post 802 to help prevent the club tag from being easily dislodged from the golf club grip.

Figure 9A:
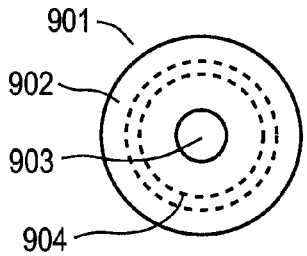
FIGS. 9A and 9B respectively show a top view and a side cross section view of a golf club shaft and grip.
Figure 9B:
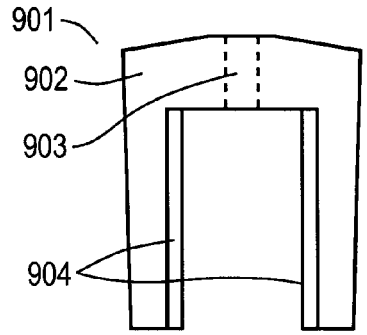

FIGS. 9A and 9B show the top portion of a typical golf club shaft and grip. The grip material 902 is commonly rubber but can be many different materials. The hole 903 at the end of the grip provides ventilation for installation of the grip onto a golf club shaft 904.

It is desirable to provide a system that integrates the golf club tag into the grip portion of the golf club in a way that the tag fits the grip in an optimum way. In one embodiment, inserts designed specifically to receive club tags are included in the golf club grips at the time of manufacture, as shown in FIGS. 12A, 12B, 15F and 15G. In other embodiments, golf club grips are manufactured with openings or voids designed to receive club tags, as shown in FIGS. 16A, 16B, 16C, 17A, 17B, 17C, and 18A-18D. In other embodiments club tags are embedded in the grip at the time of manufacture.

Figure 10A:
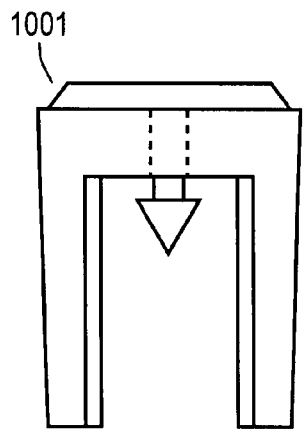
FIG. 10A shows a side view cross section of a golf club shaft and a golf club grip with a flat top with a club tag attached to the golf club grip.
Figure 10B:
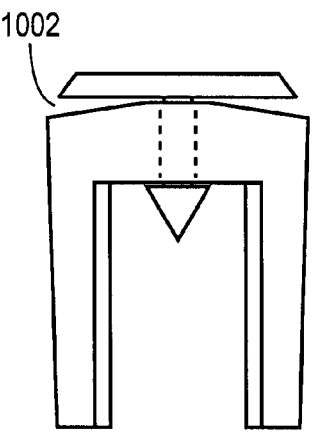
FIG. 10B is a side view cross section of a golf club shaft and a golf club grip with a dome-shaped top with a club tag attached to the golf club grip and FIG. 10C is a side view cross section of a golf club shaft and a golf club grip with a dome-shaped top and a club tag filler gasket with a club tag attached to the golf club grip.
Figure 10C:
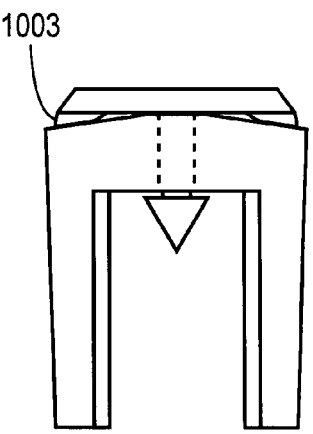
Figure 11A:
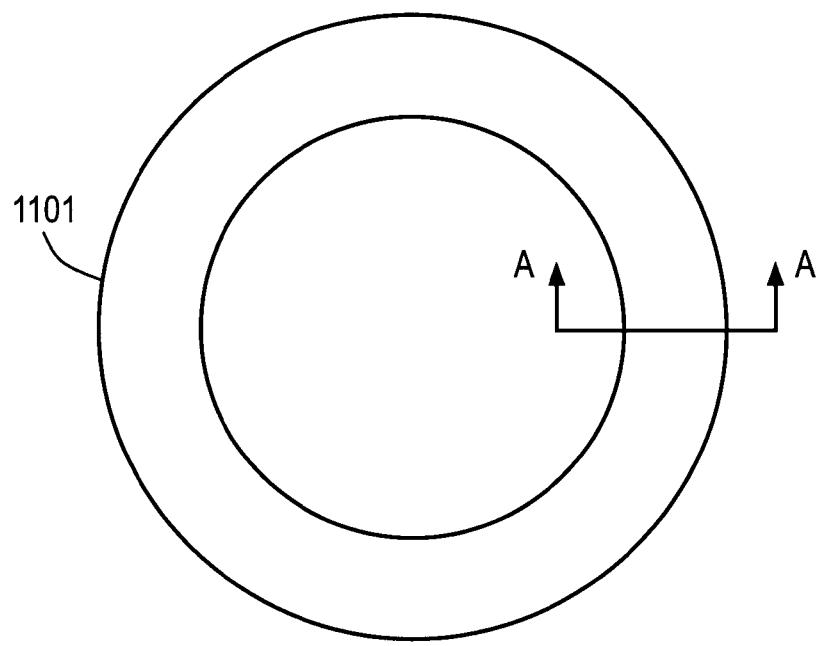
FIG. 11A shows a top view and FIG. 11C shows a cross-section view of one embodiment of a club tag filler gasket.
Figure 11C:
Figure 11B:
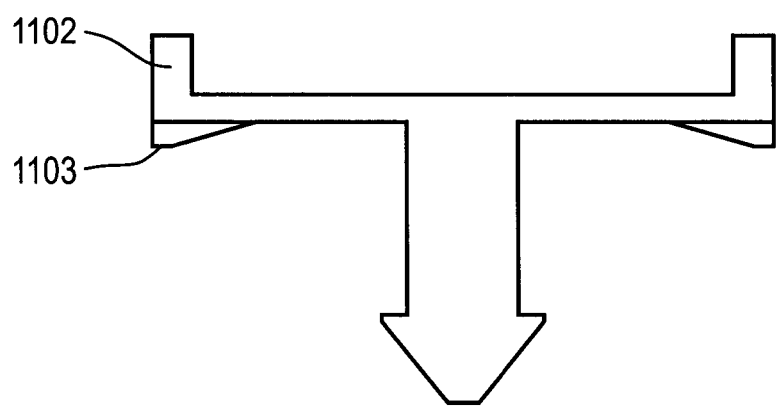
FIG. 11B shows a side view cross section of one embodiment of a club tag filler gasket attached to one embodiment of a club tag.

As shown in FIGS. 10A, 10B, and 10C, golf club grips come in many configurations. Some grips have flat tops 1001 and some have dome shaped tops 1002. In one preferred embodiment, the club tag has a flat underside that connects to the golf grip. For a golf grip with a flat top, the club tag would rest flat against the top of the grip 1001. For a golf club grip with a domed top, the club tag would rest against the top of the dome and there would be space between the outer edges of the club tag and the grip 1002. A club tag gasket 1003 can be inserted between the club tag and the grip to fill in the space. One embodiment of a club gasket is shown in FIGS. 11A, 11B, and 11C. FIG. 11A shows a top view and FIG. 11C shows a section view of a club tag gasket 1101. As shown in FIG. 11B, the gasket 1103 can be attached to the underside the club tag 1102 to fill the space created by a domed grip. This gasket 1103 would eliminate movement or vibration caused by the space and would also be more aesthetically pleasing. It could be attached using adhesive such as double sided pressure-sensitive adhesive or it could be held in place by the pressure between the club tag and golf club grip. One embodiment of the gasket is shown in FIG. 11C as a cross section taken at FIG. 11A, Section AA. The gasket is thicker at the outside edge to fill in the gap. Alternatively, the gasket could be made of compressible material of the same thickness, such that the gasket is compressed at the inner diameter and not compressed at the outer edge.

Golf club grips can be manufactured with features designed specifically to receive club tags. A golf club grip 1701 can be manufactured to accept the club tag as shown in FIGS. 16A, 16B, 16C, 17A, 17B, and 17C. The grip could include an indentation 1601 in the top of the grip designed to hold the club tag 1602. In this example the club tag could be attached such that the top portion of the club tag could still allow light to enter the tag from the sides (if a side light pipe is used). Optionally, the grip could include a "plug" to fill the area intended to receive a club tag until such time the golfer removes the plug and attached the club tag. The plug could be designed to look substantially like a standard golf club grip. The plug could include logos, etc. Alternatively the grip could include a similar indentation 1702 to hold a club tag or club tag electronics 1703 configured with no plastic housing or partial plastic housing. A separate cover 1704 can be used to seal the club tag 1703 into place. In these embodiments translucent grip material can be used selectively to allow light to reach the light sensors on the club tag electronics. Another embodiment of a manufactured golf club grip is shown in FIG. 18A. The grip 1804 is manufactured with an internal slot 1803 accessed by an external cutout 1801. The club tag 1802 is provided as a self-contained disk 1805 and 1806 as shown in FIG. 18C. The disk 1802 slides into the grip as shown in FIG. 18B and is seated in the grip 1807 as shown in FIG. 18D. In this configuration clear grip material could also be used to allow light to reach the club tag electronics.

Figure 12A:
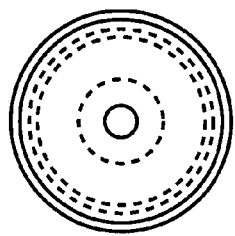
FIG. 12A shows a top view and FIG. 12B shows a side view of one embodiment of an insert designed to be attached to a golf club grip and designed to receive a club tag.
Figure 12B:
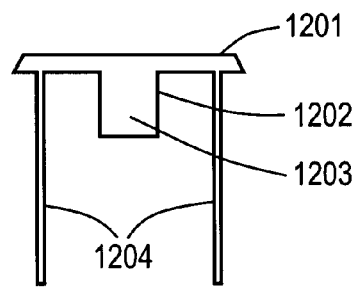

Golf club grips can be manufactured with inserts designed specifically to receive club tags as shown in FIGS. 12A, 12B, 13A, 13B, 14, and 15F and 15G. FIGS. 12A and 12B show an example of a golf club grip insert designed to receive a club tag. The insert can be designed to fit the shape of the club tag. For example, the grip, as shown in FIG. 12B, has a flat top part 1201 designed to receive a club tag with a flat bottom part. The shapes can vary—the idea is to have a custom fitting system where the club tag fits well with the golf club grip insert. The insert could have a feature 1202 with a hole 1203 designed to serve as both a vent to allow proper installation of golf club grips onto golf club shafts and as a means to attach the club tag to the grip insert. Club tags could be designed with features for mating to the golf club grip insert, as shown in FIGS. 15A through 15E. For example, the club tag post could have threads or other features designed to attach the club tag snugly to the grip insert. The club tag insert could have "legs" 1204 designed to be molded into the grip during the grip manufacturing process. The legs 1204 could have holes or teeth such that the grip rubber surrounds and attaches itself to the golf club grip insert securely.

Figure 13A:
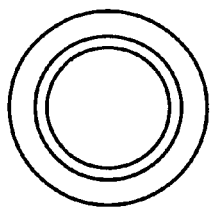
FIG. 13A shows a top view and FIG. 13B shows a side view cross section of a golf club shaft and golf club grip with the top removed.
Figure 13B:
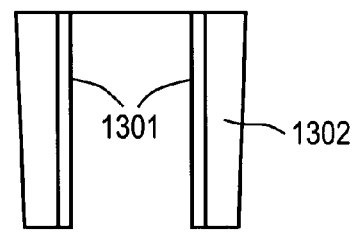
Figure 14:
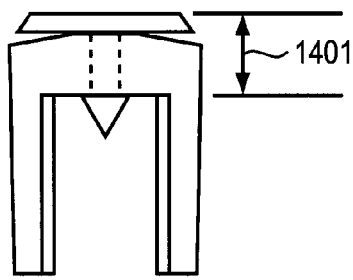
FIG. 14 shows a side view cross section of a golf club shaft and golf club grip with a club tag attached and highlights the increase in height to the top of the grip when a club tag is attached.
Figure 15F:
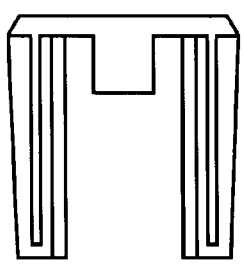
FIGS. 15F and 15G show two side views of a golf club shaft and a golf club grip with an insert designed to receive a club tag attached to the golf club grip.
Figure 15G:
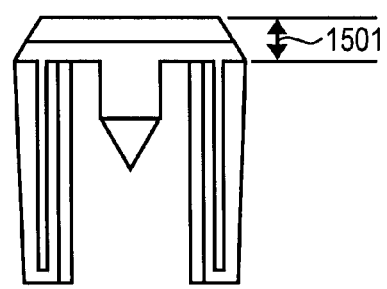

FIGS. 13A and 13B show the top portion of a golf club shaft 1301 and grip material 1302 with the top of the grip material only extending as high as the top of the golf club shaft (not how grips are made now). In one embodiment, the golf grip insert would become the top of the grip after being attached to the grip in the grip manufacturing process as shown in FIG. 15G. FIG. 14 highlights the profile 1401 of a standard dome-shaped grip with a club tag attached. The profile is tall compared to profile 1501 shown in FIG. 15G. Profile 1501 shows how a golf club grip insert with a club tag attached could have a lower profile, more aesthetically pleasing appearance.

Club Tag Antenna Configuration Options

There are several configurations for the antenna on the tag. One option is to print the antenna as a metal trace on the printed circuit board 1902 as shown in FIG. 19A. A battery 1901 can be disposed under the board 1902, and the battery 1901 can be coupled, through circuit traces on board 1902, to one or more ICs (integrated circuits) that form the circuitry of the tag (see, for example, the circuit of FIG. 6). The ideal length for this trace, based on one-quarter the wavelength of the transmit frequency, is considerably longer than the space available. The antenna trace is considered an inductor and a parallel capacitor is selected to resonate with the antenna inductance at the selected transmit frequency, such as 433 MHz. This antenna trace could be in the form of an arc 1903, as shown in FIG. 19A. It could also be in other forms, such as a rectangle or coil, to best fit in the configuration of the printed circuit board. Another option is to print the antenna as a metal trace on both sides of the printed circuit board with the two traces exactly opposite each other. The traces 1909 are then connected by vias 1907 through the printed circuit board as shown in FIG. 19D. An opening 1908 (shown in FIG. 19D) can provide light to a sensor (e.g. light sensor 1905) located under the board 1902.

Another configuration for the antenna is to add a metal piece 1904 in the shape of the trace on top of the antenna trace on the printed circuit board as shown in FIG. 19B. Alternatively, as shown in FIG. 19C, this metal piece 1906 may be spaced above the printed circuit board with or without an antenna trace on the printed circuit board. Spacing the antenna above the printed circuit board without a printed antenna trace offers more room for components to be installed under the antenna, possibly reducing the size of the printed circuit board and the overall size of the tag.

Figure 20:
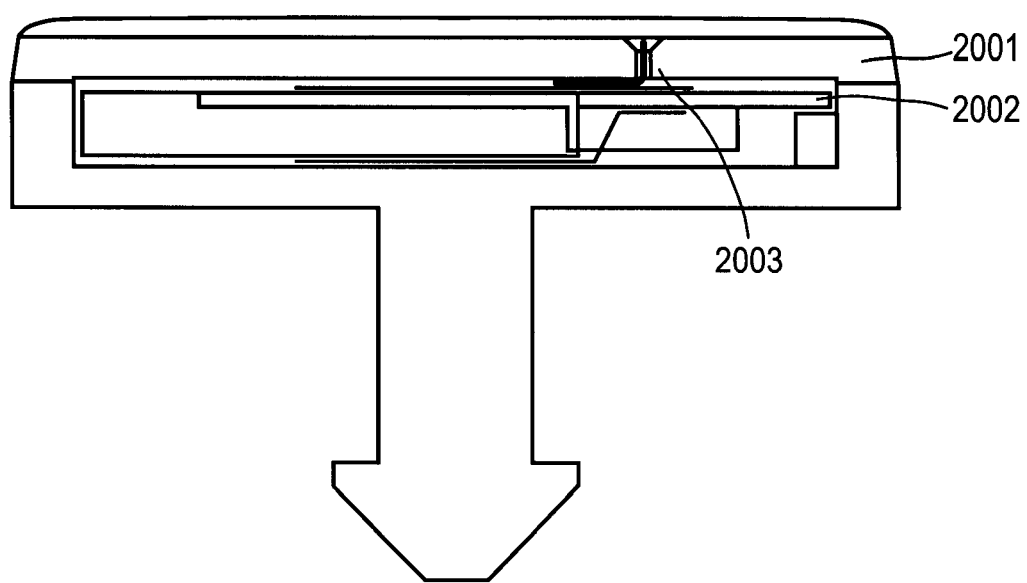
FIG. 20 is a side view cross section of a club tag designed with the antenna on top of the light pipe and connected to the printed circuit board with a conductive material.

Other antenna techniques include applying metallization to the cover of the tag to enhance antenna performance. The metallization could be applied to the entire surface of the tag or selectively applied. The metallic surface is connected to the printed circuit board 2002 with a wire extending through the feature, such as a countersink or hole 2003 as shown in FIG. 20, that focuses light that enters the tag. This wire attaches to the metallization and to the transmitter output on the printed circuit board. The metallization can be applied to the top surface of the clear light pipe part 2001 and serves as a reflector for the light that enters the tag. The metallization can be on the top surface of the light focusing feature as well. A light pipe with metalized surfaces could also provide improved durability of the tag.

Some of the options for selective metallization on the cover of the tag include creating various shapes of the metalized antenna in the cover. These shapes could include an arc, a circle, or a coil, for example.

Figure 21:
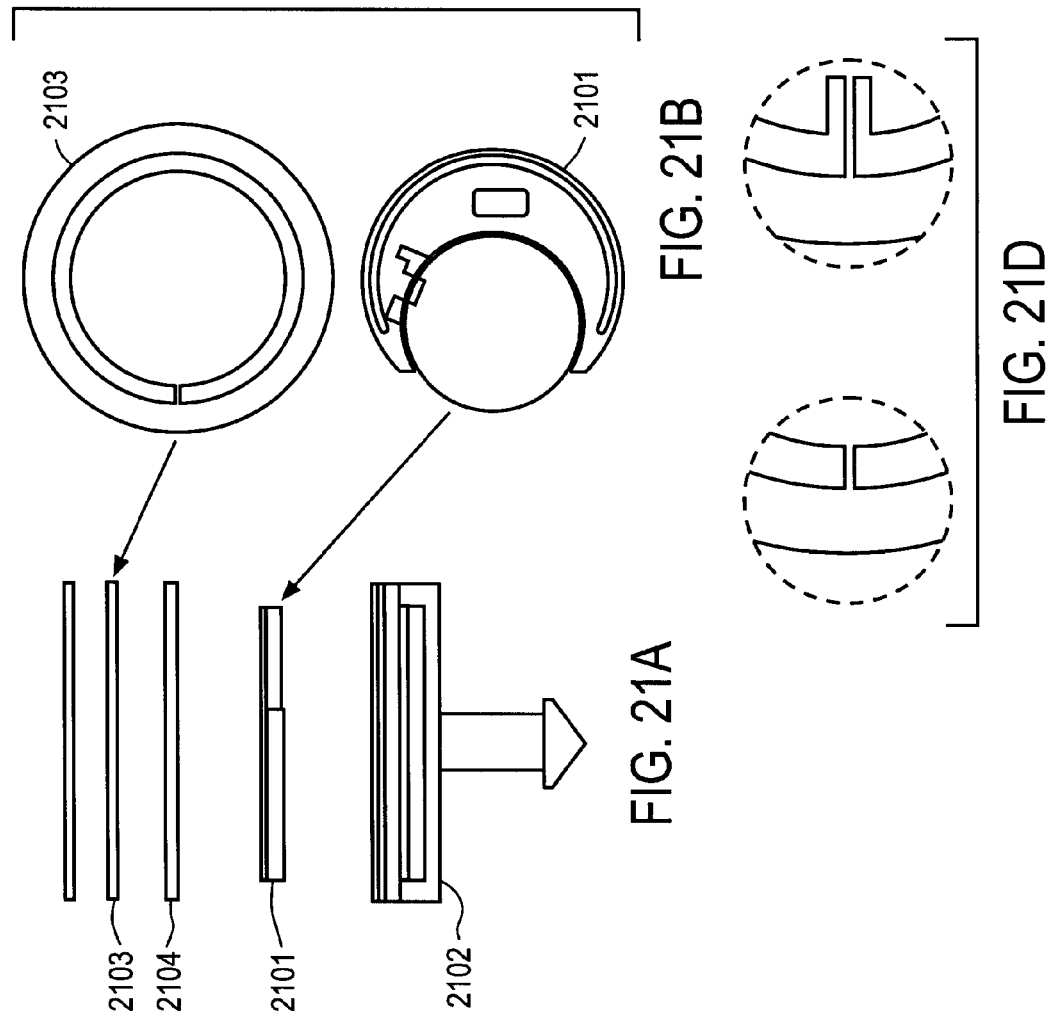
FIG. 21A is a side view cross section of a club tag, showing the printed circuit board and metallized antenna board.
FIG. 21B is a top view of a club tag printed circuit board and the metalized antenna board.
FIG. 21C is a top view of an alternate metalized antenna board.
FIG. 21D is a top view detail of the gap in the metalized antenna board.

Another antenna technique to enhance antenna performance is to apply metallization to the cover of the tag such that the metallization is not connected to the printed circuit board. The metallization can be the same shape as the printed trace on the printed circuit board, but it is positioned above the trace on the board. In this way the metallization acts to enhance the signal without a physical electrical connection. FIGS. 21A, 21B, and 21C show some embodiments of this technique. FIG. 21A shows a cross-section side and exploded view of the club tag with its various components. The main printed circuit board 2101 mounts in the housing 2102. The metalized antenna board 2103 mounts above and spaced away from the main printed circuit board. The light pipe 2104 is located between the main printed circuit board 2101 and the metallized antenna printed circuit board 2103. The light pipe creates consistent fixed spacing between the two printed circuit boards. The two antennas, the antenna on the main printed circuit board 2101 and the antenna on the metallized antenna printed circuit board 2103, are inductively coupled. The light pipe 2104 creates the fixed physical spacing between the two antennas.

In one embodiment in FIG. 21B, the metallization can be a full circle with a gap. This gap can act as a capacitor that tunes the circuit to the same frequency as the tag. The capacitance can depend on the spacing of the gap. Alternatively, as shown in FIG. 21C, the gap can be constructed such that there are two metallic stubs next to each other acting as the parallel plates of a capacitor. FIG. 21D shows the gap in detail. Alternatively, a small chip capacitor can be soldered to the metallization across the gap.

System Automation Options

There are several embodiments of the data collection system. In one embodiment, the golfer removes a club from the golf bag for the golf stroke, the tag transmits that it is out of the bag (the transmission can include an identifier of the particular club), and the golf club number or description appears on the display of the golf GPS device. The golfer pushes a button on the golf GPS device to mark the spot and record which club is in use for the stroke. If a golfer removes several clubs from the bag before deciding which club to use, all of these clubs would appear on the display of the GPS device. When the golfer pushes a button to mark the spot, the golf GPS device prompts the golfer to select which club will be used out of the several that are reported out of the bag by their corresponding tags. One technique to select which club is in use is that the golf GPS device would highlight the "middle" club as a default. That is, if the golfer removes the 5, 6, and 7 irons from the bag, the golf GPS device would highlight the 6 iron as the default and the golfer can select that one or scroll up or down to select one of the other clubs.

It is desirable to limit the amount of information the golfer has to enter into the golf GPS device. In the described embodiment, the golfer has to push a button to mark the spot at each stroke. If more than one club is out of the bag, the golfer has to select which club is in use. One technique for automatically selecting the club in use is to use receiver signal strength in the receiver in the golf GPS device. The golf GPS device is often worn on the golfer. When the golfer has a club in hand, that particular club is closest to the GPS device and will provide the strongest signal. By selecting the club with the strongest signal, the GPS device can display that this is the club in use.

Additional techniques can be used to automate the system further. The golf GPS device could use intelligence, such as length of time at particular GPS location, to determine when to mark the spot automatically. A sequence of events could be required, such as removing the club(s) from the bag, being in one spot for longer than a period of time, for example 2 minutes, and if there are several clubs and one is received as the strongest signal. If all of these conditions are met, the system would automatically record the current position and club in use. Similarly if only one club is out of the bag, and the golfer is in the spot for longer than a predetermined amount of time, the system would record position and club in response to expiration of the predetermined amount of time.

System Alerts

The club tags transmit based on the sensing of light and darkness. There will be times when it is too dark for the system to function properly. Because some golfers will play early in the morning or late in the evening, when there is insufficient light for the tags to function properly, the system can include an alerting means—warning the golfer of such conditions. This way, the golfer will realize that it is too dark to rely on the system and not think that the system is working properly. In one preferred embodiment, photo sensors on the receiving unit or bag-mounted device or in a tag of a club can prompt an alert to the user based on the level of light sensed at the receiving unit or at the bag-mounted device or in a tag of a club. This sensor, for example, can be a light sensor coupled to the microprocessor 523 in the golf GPS device 511 shown in FIG. 5. The alert can be in the form of a message on a screen, a sound, a vibration, etc. In an embodiment in which the light sensor is not integrated with the receiving unit (such as an embodiment in which the light sensor is on the golf club or is on a bag mounted device that is separate from the receiving unit), then the signal indicating insufficient light can be transmitted to the receiving unit which can then present the message. In another embodiment the receiving unit (such as the golf GPS device 511), if equipped with time of day information (e.g. from on-board GPS) the receiving unit could rely on time of day information and sunrise/sunset information, including civil twilight information to alert the user when it is too dark to rely on the system. This latter approach may be less reliable as users could be using the system (e.g. learning tags) indoors at night with the lights on and receive a false indication that it is too dark to rely on the system. A combination of the two approaches could also be useful. For example, the receiving unit could first rely on light sensor information on board the receiving unit, then time of day information.

System Security Options and Methods

It is against the rules of golf for one golfer to obtain information about the golf club used by another golfer during a round of golf, other than by mere observation. Any physical act taken by one golfer to obtain such information is a breach of the rules of golf.

It is possible that the USGA and R&A would be concerned about the security of the club tag system described herein. There may be a concern that competitors would be able to find out what club another golfer is using by receiving the information that is transmitted by their competitor's club tag. If a person desires to cheat it is possible for them to do so. Features can be incorporated into the product, however, that would make cheating much more difficult.

In one embodiment, the system will require that club tags be "learned" by the receiving unit. As previously described, the receiving unit can have several embodiments. For example, the receiving unit could be a handheld GPS device, a golf-bag mounted device that communicates with tags and a handheld device, a cell phone or cell phone accessory, or several other embodiments. The receiving unit can be configured to receive or to transmit and receive communication with tags and other devices.

As described in this application and in application Ser. No. 12/405,223, one method for learning tags is as follows:

Each tag has a unique identifier.

The golfer changes the mode of the receiving unit (e.g. a golf GPS rangefinder) to "learn" (e.g. a learn tag mode in which information about a new tag for a golf club is stored/learned into the receiving unit).

The golfer is instructed to expose the club tags, one at a time, to light or darkness to cause the club tags to transmit the unique identifier.

Upon receipt of the club tag identifier, the receiving unit prompts the golfer to assign a name to the club or club tag, by either selecting a name from a pre-populated list or by assigning a custom name.

When all the clubs are learned in this manner the golfer is ready to use the system on the golf course, in "play" mode.

In the method of learning clubs described above it is possible that a golfer could cheat during a round of golf by using a receiving unit in learn mode in close proximity to another golfer. For example, if Golfer A is trying to cheat by obtaining club information from Golfer B, Golfer A could be in close proximity to Golfer B and Golfer A could have a receiving unit in learn mode. When Golfer B removes a club, Golfer A would receive the club identifier. If Golfer A could see which club Golfer B used (associated with the received identifier), Golfer A could now associated that club type with the identifier and Golfer A would be able to know whenever Golfer B removes that club from the bag again.

To make cheating during play more difficult, the following method can be incorporated. This method would make cheating, using un-modified equipment, very difficult. This method would work for direct tag-to-receiving unit communication and for the configuration where there is a bag-mounted device communicating with the tags and receiving units.

When the receiving unit is in LEARN mode the user has to take a specific series of actions (that would be unnatural during normal play of the game) to successfully learn tags. One example of a more secure LEARN process is as follows: The user is instructed to:

1) Attach all tags to clubs and replace all clubs in golf bag.
2) Configure the receiving unit (e.g. a golf club rangefinder) to be in LEARN mode (e.g. a learn tag mode in which information about a new tag on a golf club is stored/learned into the receiving unit).
3) Remove one club to learn it. The receiving unit receives the identifying code and prompts the user to:
4) Name the club or tag. After naming the club or tag, the user is prompted to:
5) CONFIRM the learning of that club. The user is asked, in one embodiment, to replace the club in the bag (receive a prompt) then remove the same club (within a period of time) from the bag to confirm the learning of that club. In another embodiment, the user is asked to press a button on the tag or grip.
6) When in LEARN mode, after the club is named, the user will have a limited amount of time to CONFIRM the learning of that club.
7) If the tag is not CONFIRMED, the tag code is not store or displayed on the receiving unit.

In a system with the security method described above the "cheater" that is trying to learn another golfer's clubs by using his own receiving unit in learn mode would not be able to as it is not normal for a golfer to remove a club, replace the same club and remove it again (within say 30 seconds or to repeatedly press a button on the tag or grip). The "cheater's" receiving unit would never store or display the other golfers unique tag codes as they would not be CONFIRMED.

Figure 22:
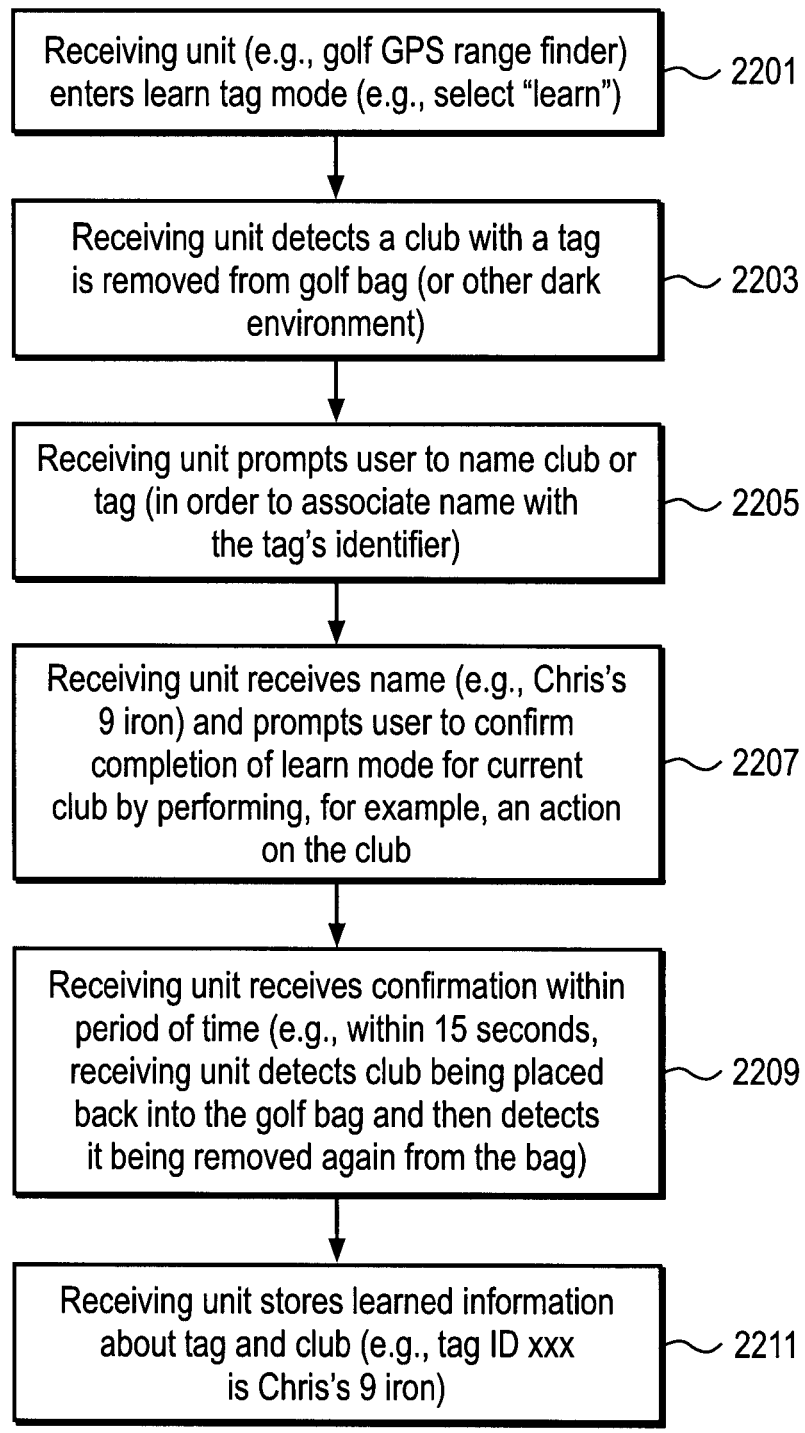
FIG. 22 is a flowchart that shows an example of a method for providing a more secure learn tag mode in one embodiment of the invention.

FIG. 22 shows a flowchart that represents one method of an embodiment that can implement a secure learn tag mode. In operation 2201, the receiving unit, which may be a golf GPS rangefinder, enters the learn tag mode in response to user selection of an option to place the receiving unit in that mode. In one embodiment, the user can collect together all golf clubs having new tags which need to be programmed into the receiving unit and insert those clubs into a golf bag so that the portion of the club having the new tag is in a dark environment, such as the bottom of a golf bag. Alternatively, the user could cover the golf grips containing the tags with a thick blanket to create a dark environment. Then the user can remove a club, one at a time, in order to program the receiving unit for that selected club. This is shown in operation 2203 in which the receiving unit detects a club with a tag has been removed from the golf bag (or other dark environment). The removal of the tag from the dark environment will cause the tag to wake up and will further cause the tag to transmit its identifier to the receiving unit. Because the receiving unit is in a learn mode, the receiving unit will respond, in operation 2205, by prompting the user to enter a name for the club or other information in order to associate the tag's identifier, which may be a unique number, with a name for the club. In operation 2207, the receiving unit receives, through user input, a name or other identifier provided by the user, and once the user has completed all of the data entry required by the receiving unit, the receiving unit can prompt the user to confirm completion of the learn mode for the current club by performing, for example, an action on the club. The action should be an unnatural action on a golf course which would reveal the actions of a cheater. In one embodiment, the action can be, for example, requiring the user to place the club back into the golf bag or other dark environment and then remove it quickly from the golf bag or dark environment and then quickly place it back into the golf bag or dark environment, all within a predetermined period of time, such as 15 seconds or 30 seconds. In another embodiment, the action can be requiring a user to press a button on the tag or on the grip of the golf club, or in another embodiment, the sequence of operations (in/out) may be reversed, etc. If the receiving unit does not detect the requested action within a predetermined period of time, the receiving unit will not confirm the learning and hence not store or associate the club's identifier with the name provided by the user. Hence a cheater's receiving unit will not be able to record a club name or other identifier of the club. In operation 2209, the receiving unit can receive confirmation within a period of time in one embodiment, and if confirmation is received, as shown in operation 2211, then the receiving unit stores the learned information about the tag and the club. In one embodiment, operation 2209 can require an action which includes putting the club back into the golf bag or other dark environment and then removing it from the bag or other dark environment and then putting it back into the bag or dark environment all within a predetermined period of time, such as 15 seconds or 30 seconds.

Further, the configuration described above simplifies the security measures required in the product. Without the method described above (requiring an unnatural confirmation step) other security means might be required in the product. Other security measure might include:

Adding data (e.g. a pre-assigned bag-mounted device identifier) to the transmission from a bag-mounted device so that only receiving units that have already been "paired" with that specific bag-mounted device would be able to receive transmissions. Adding such data lengthens transmission time and could have a negative impact of transmission collisions.

Programming the bag-mounted device with the ESN (Electronic Serial Number) from the receiving unit. Similar to above, once the bag-mounted device has the receiving unit ESN stored, the receiving unit ESN could be added to the data transmitted from the bag-mounted device. Programming the ESN into the bag-mounted device might require additional features such as: connection port in the bag-mounted device (e.g. USB) or additional RF components in either the receiving unit or the bag-mounted device.

In a system with tags configured as transceivers there are more options for adding security. For example, in one embodiment the tag could send an initial transmission or transmissions that do not identify the club. Upon receipt of the transmissions the receiving unit could encode the response transmission (e.g. with an equipment serial number). Then the tags, upon receiving the response transmissions (with an ESN the tags have previously been "paired" with), add the tag identifier and return the transmission. This transmission or transmissions would only be receivable by the receiving unit with the matching ESN. This method, however, does require more transmissions and introduces more possibilities for collisions. Another example is an embodiment in which the tag, in its first learning session with a receiving unit, sends its initial identifier to the receiving unit and then the user enters a club name, etc. and upon completion of data entry, the user instructs the receiving unit to complete the learning process. Then the receiving unit sends a one-way hashed version of the tag's code to that tag and that code is used, on the next transmission from the tag, as the tag's identifier, and this process repeats so that the tag's identifier is updated after each transmission from the tag so that the tag's identifier changes over time and it is not used repeatedly.

Using a minimum acceptable signal strength received from the tag to determine that this is the desired club to LEARN. In this way, clubs that are not close to the device are not recognized. Additionally, if the retailer offers a service to LEARN or "pair" clubs to a GPS device, the device would recognize only a nearby club and not a club a distance away. This would allow for several LEARN or "pair" stations at the retailer to coexist without interfering with each other.

These additional measures would add cost and complexity to the design of the product but might eliminate the need for a confirmation step during the learning process There are of course other methods of cheating that are not easy to remedy. For example, Golfer A could steal Golfer B's receiving device (bag mounted device or handheld device with RFID receiving capability) and monitor which clubs Golfer B was selecting from the golf bag. This would require that Golfer B did not notice the theft of the device and Golfer A would have to be in close enough proximity to Golfer B during the round to receive the signals from the club tags or a bag-mounted repeating device.

Also, with modified RF equipment and a means to obtain golf club information from a distance a person could still cheat, but this is an example of going to extraordinary measures to cheat at golf.

Method of Tracking Golf Clubs for Marketing Purposes

It is contemplated that the golf club tags or tag electronics can be built-in to the golf club grips at time of manufacture. A golf equipment manufacture may desire to maintain a database of golf equipment sold (e.g. golf clubs). This database could contain detailed information about the equipment. For example, in the case of golf clubs, the database could contain details of the various components of the club, such as shaft material, club head loft, etc. A tag could be included permanently in the golf club grip, and a corresponding bar code label could be attached to the outside of the grip. The bar code contains the same identifier as contained in the tag and the bar code label would travel with the tag throughout the manufacturing process of the tag. When the tag is embedded in the golf grip, the bar code label is attached to the exterior of the grip. This way golf equipment manufacturers can use bar code reading equipment (that they are likely already set up with). After the golf club is assembled, the bar code is scanned by the equipment manufacturer and the specific components are recorded into the equipment manufacturer's database. When the customer receives the product, the data can then be tracked by the equipment manufacturer, due to the wireless communication between the club tag and devices that can be connected to the Internet for data uploading and downloading. The data in the club tag contains the same identifier as the bar code, which also matches the identifier in the equipment manufacturer's database. The equipment manufacturer can now take advantage of observing use patterns of the golfer. Alternatively, in lieu of including a bar code and bar code reader in the process, the data can be tracked using the tag transmissions and a RF receiver to capture the data and record it in a database. This would eliminate the need for a bar code to travel with the tag as it is manufactured but would potentially require the equipment manufactures to modify their equipment and processes to receive the tag transmissions. Another option is to use the active tag in the club in conjunction with a passive RFID tag that could be read by a RFID reader. This concept with the passive RFID tags would be in lieu of active club tags plus bar code labels.

The golfer would in one embodiment register the club online with the GPS device company to take advantage of compiling data corresponding to the golf games played and club usage. Additionally, the system gathers information about which golf course the golfer is playing, how often he/she uses this club and how often they golf. This is valuable information that could be provided to the retailer in determining golfer's preferences.

Figure 23:
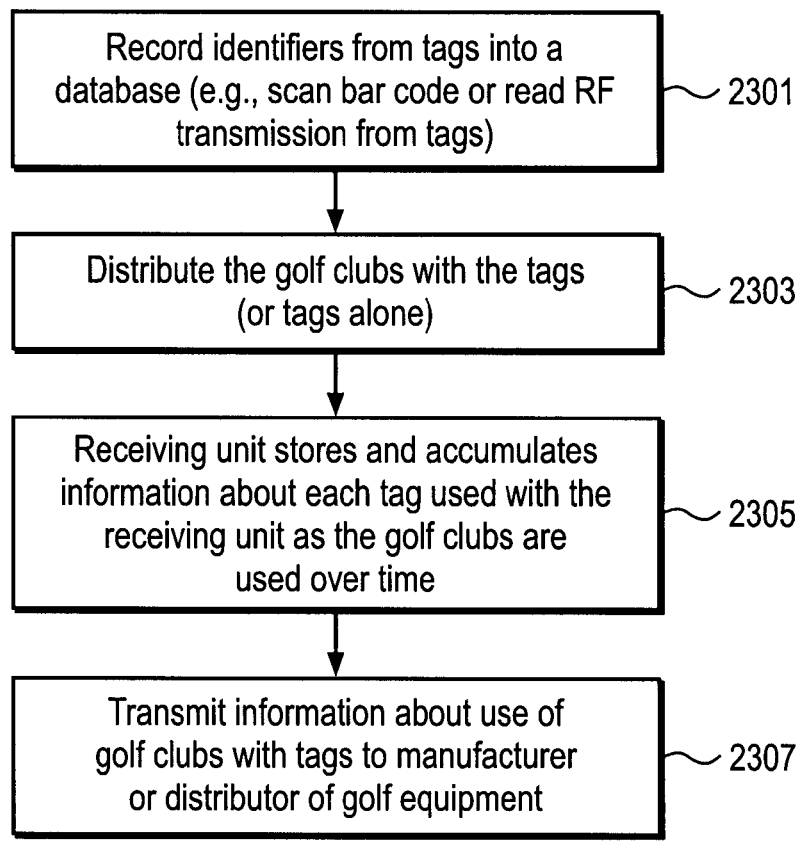
FIG. 23 is a flowchart that shows an example of a method for obtaining information about golf clubs after they are distributed to golfers according to another embodiment of the invention.

FIG. 23 shows an example according to one embodiment to operate a data collection system, such as a data collection system at a golf club manufacturer or golf equipment distributor, such as a retailer, etc. The data collection system, in one embodiment, uses a device that is a GPS golf rangefinder that accompanies the golfer and collects information about golf club usage in the presence of the device. In one embodiment, the golf club can be mounted with one or more of the tags described herein, such as the tag shown in FIG. 6 to create the system shown in FIG. 5, in which the tag communicates with the golf GPS device, such as the golf GPS device 511. The golf GPS device can accumulate information over many months about the usage of one or more golf clubs, and this information can include a list of golf courses played at, how often the club is used and how often the user plays golf. The golf GPS device can record the days or dates that golf was played on, how often the golf club was used on those days, and an identifier of each golf course played at by the golfer. The identification of a golf course can be derived from the location information obtained from the GPS receiver during playing of the golf games. This information can be accumulated over time and then provided through a data network, such as a cellular telephone network or the Internet, etc. to the manufacturer of the golf club or to another golf club manufacturer or to other golf equipment manufacturers or to retailers or other distributors of golf equipment. The accumulated information can be, in one embodiment, uploaded from the golf rangefinder (or other device) to a data processing system (e.g. a server) used by the manufacturer or manufacturers or retailers or other distributors, either directly from the golf rangefinder (e.g. through a WiFi or Ethernet or cellular telephone connection provided by the golf rangefinder), or the accumulated information can be copied to another device (e.g. a laptop computer or other data processing system) which in turn can upload the accumulated information to the data processing system used by the manufacturer or manufacturers or retailers or other distributors. In the method of FIG. 23, the golf club manufacturer can associate the identifiers from the tags with golf clubs having been made previously by virtue of operation 2301 in which the manufacturer records identifiers from the tags into a database. This can be performed by scanning a bar code or by reading the RF transmission from the tags on the golf clubs. This is performed prior to distributing the golf clubs with the tags in operation 2303. In other words, the golf club manufacturer or the tag manufacturer is recording this information into the database prior to distributing the golf clubs or the tags separately to golfers. When the golf GPS device transmits the information, as in operation 2307, that information will include the identifiers previously recorded, which will allow the golf club manufacturers or golf equipment distributors, to associate the information with the previously stored identifiers for each golf club or tag. The receiving unit, in operation 2305, stores and accumulates the information about each tag as described herein prior to transmitting that information in operation 2307.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for determining whether a golf club has been removed from a golf bag, comprising:
    a first light sensor which has an output;
    a second light sensor;
    a light pipe, the light pipe being configured to direct light toward the first light sensor;
    a radio frequency (RF) transmitter coupled to the first light sensor, the RF transmitter being configured to transmit one or more signals indicating that a golf club has been removed from or replaced into a golf bag, the one or more signals being generated in response to a change of state of the first light sensor; and
    a logic circuit coupled to the first light sensor and coupled to the second light sensor, the logic circuit being configured to be activated based on a comparison of one or more measurements of light from the first light sensor with a first stored value, and wherein the logic circuit is configured to determine whether to change a status of the logic circuit based on a second comparison between one or more measurements of light intensity from the second light sensor and a plurality of second stored values, wherein when the second comparison is smaller than a first value the logic circuit adds the one or more measurements of light intensity from the second light sensor to one of a plurality of stored averages and the status does not change, wherein when the second comparison is greater than the first value the logic circuit compares the one or more measurements of light intensity from the second light sensor with a second value, wherein when the one or more measurements of light intensity from the second light sensor is greater than the second value the status is changed and a golf club identifier and the status are transmitted, wherein when the one or more measurements of light intensity from the second light sensor is less than the second value the status does not change, and wherein the logic circuit is configured to enter a sleep mode when the first and the second light sensors do not detect light for a period of time.

2. The apparatus as in claim 1 further comprising:
a battery; and
an antenna;
wherein the logic circuit is coupled to the battery and coupled to the antenna, and wherein the logic circuit is configured to cause the RF transmitter to transmit the one or more signals; and
wherein the light pipe is adapted to block light from a first direction and to allow light to enter the light pipe from a second direction.

3. The apparatus as in claim 1 wherein the light pipe comprises:
an opaque portion, the opaque portion configured to block light from entering in the light pipe; and
a transparent or translucent portion coupled to the opaque portion, the transparent or translucent portion configured to allow light to enter the transparent or translucent portion.

4. The apparatus as in claim 3 the opaque portion further comprising a reflective layer being disposed between the opaque portion and the transparent or translucent portion.

5. The apparatus as in claim 3 wherein the transparent or translucent portion allows light to enter from 360 degrees.

6. The apparatus as in claim 1 the light pipe further comprises a light redirecting feature to direct light toward the first light sensor.

7. The apparatus as in claim 5 the light pipe further comprises a light redirecting feature to direct light toward the first light sensor, and the apparatus includes a diffusely reflective surface.

8. The apparatus as in claim 7 wherein the light redirecting feature is substantially parabolic.

9. The apparatus as in claim 7 wherein the light redirecting feature is a countersink.

10. The apparatus as in claim 7 wherein the light redirecting feature is filled with a material to direct the light toward the at least one sensor.

11. The apparatus as in claim 7 wherein the light redirecting feature further comprises a reflective surface.

12. A method of determining whether a golf club has been removed from a golf bag, comprising:
comparing one or more measurements of light intensity to a first stored value to provide a first comparison;
activating a processing system based on the first comparison of the one or more measurements of light intensity with the first stored value;
determining whether to change a status of the processing system based on a second comparison between the one or more measurements of light intensity and a plurality of second stored values,
wherein when the second comparison is smaller than a first value, the processing system adds the one or more measurements of light intensity to one of a plurality of a stored averages and the status does not change,
wherein when the second comparison is greater than the first value, the processing system compares the one or more measurements of light intensity with a second value,
wherein when the one or more measurements of light intensity is greater than the second value, the status is changed, and a golf club identifier and the status are transmitted, and
wherein when the one or more measurements of light intensity is less than the second value, the status does not change; and
enabling a sleep mode when one or more light sensors do not detect light for a period of time.

13. The method as in claim 12 wherein the processing system is a microcontroller and wherein activating the microcontroller is triggered by a change in the one or more measurements of light intensity.

14. The method as in claim 12 wherein the processing system is a microcontroller and wherein activating the microcontroller is triggered by an elapse of time.

15. The method as in claim 12 wherein the plurality of second stored values comprises a dark average and a light average.

16. The method as in claim 12 further comprising:
receiving light;
diffusing the light through a light pipe, the light pipe configured to diffuse light toward one or more light sensors, the one or more light sensors configured to receive the diffused light and to provide the one or more measurements of light intensity to the processing system.

17. A computer readable non-transitory storage medium comprising executable instructions which when executed on a processing system cause said processing system to perform a method comprising:
comparing one or more measurements of light intensity to a first stored value to provide a first comparison;
activating a processing system based on the first comparison of the one or more measurements of light intensity with the first stored value;
determining whether to change a status of the processing system based on a second comparison between the one or more measurements of light intensity and a plurality of second stored values,
wherein when the second comparison is smaller than a first value, the processing system adds the one or more measurements of light intensity to one of a plurality of stored averages and the status does not change,
wherein when the second comparison is greater than the first value, the processing system compares the one or more measurements of light intensity with a second value,
wherein when the one or more measurements of light intensity is greater than the second value, the status is changed, and a golf club identifier and the status are transmitted, and
wherein when the one or more measurements of light intensity is less than the second value, the status does not change; and
enabling a sleep mode when one or more light sensors do not detect light for a period of time.

18. The medium as in claim 17 wherein activating the processing system is triggered by a change in the one or more measurements of light intensity.

19. The medium as in claim 17 wherein activating the processing system is triggered by an elapse of time.

20. The medium as in claim 17 wherein the plurality of second stored values comprises a dark average and a light average.

21. The medium as in claim 17 further comprising:
receiving light;
diffusing the light through a light pipe, the light pipe configured to diffuse light toward one or more light sensors, the one or more light sensors configured to receive the diffused light and to provide the one or more measurements of light intensity to the processing system.

22. A tag configured to be attached to a golf club, the tag comprising:
- a first light sensor which has a first output;
- a second light sensor which has a second output;
- a processing system coupled to the first output and coupled to the second output;
- a radio frequency (RF) transmitter coupled to the processing system, the RF transmitter being configured to transmit one or more signals indicating that a golf club has been removed from or replaced into a golf bag, the one or more signals being generated in response to signals from the second output; and
- wherein the processing system is configured to be activated based on a comparison of one or more measurements of light from the first light sensor with a first stored value, and wherein the processing system is configured to determine whether to change a status of the processing system based on a comparison between one or more measurements of light intensity from the second light sensor and a plurality of second stored values comprising a dark average and a light average, wherein when the second comparison is smaller than a first value, the processing system adds the one or more measurements of light intensity from the second light sensor to one of a plurality of a stored averages and the status does not change, wherein when the second comparison is greater than the first value the processing system compares the one or more measurements of light intensity from the second light sensor with a second value, wherein when the one or more measurements of light intensity from the second light sensor is greater than the second value the status is changed and a golf club identifier and the status are transmitted, wherein when the one or more measurements of light intensity from the second light sensor is less than the second value the status does not change, and wherein the processing system is configured to enter a sleep mode when the first and the second light sensors do not detect light for a period of time.

23. The tag as in claim 22 further comprising:
a light pipe, the light pipe configured to diffuse light toward one or more light sensors, the one or more light sensors configured to receive the diffused light and to provide the one or more measurements of light intensity to the processing system.

* * * * *